US012185086B2

(12) United States Patent
Mangiat et al.

(10) Patent No.: US 12,185,086 B2
(45) Date of Patent: *Dec. 31, 2024

(54) HEAD POSE MIXING OF AUDIO FILES

(71) Applicant: Magic Leap, Inc., Plantation, FL (US)

(72) Inventors: Stephen Vincent Mangiat, Santa Monica, CA (US); Michael Benson Tucker, Brooklyn, NY (US); Anastasia Andreyevna Tajik, Ft. Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,277

(22) Filed: Aug. 8, 2023

(65) Prior Publication Data

US 2023/0388739 A1 Nov. 30, 2023

Related U.S. Application Data

(63) Continuation of application No. 17/888,113, filed on Aug. 15, 2022, now Pat. No. 11,778,412, which is a
(Continued)

(51) Int. Cl.
*H04S 7/00* (2006.01)
*G06F 1/16* (2006.01)
(Continued)

(52) U.S. Cl.
CPC ............. *H04S 7/40* (2013.01); *G06F 1/163* (2013.01); *G06F 3/011* (2013.01); *G06F 3/012* (2013.01);
(Continued)

(58) Field of Classification Search
CPC . H04S 7/40; H04S 7/304; G06F 1/163; G06F 3/011; G06F 3/012; G06F 3/013;
(Continued)

(56) References Cited

U.S. PATENT DOCUMENTS 6,850,221 B1 2/2005 Tickle
D514,570 S 2/2006 Ohta
(Continued)

FOREIGN PATENT DOCUMENTS

CN 102681657 A 9/2012
CN 103946733 A 7/2014
(Continued)

OTHER PUBLICATIONS

"Stems FAQ", Stems, retrieved Jul. 16, 2015, in 5 pages. URL: http://www.stems-music.com/stems-faq/inde .html.
(Continued)

*Primary Examiner* — Angie Badawi
(74) *Attorney, Agent, or Firm* — KLINTWORTH & ROZENBLAT IP LLP

(57) ABSTRACT

Examples of wearable devices that can present to a user of the display device an audible or visual representation of an audio file comprising a plurality of stem tracks that represent different audio content of the audio file are described. Systems and methods are described that determine the pose of the user; generate, based on the pose of the user, an audio mix of at least one of the plurality of stem tracks of the audio file; generate, based on the pose of the user and the audio mix, a visualization of the audio mix; communicate an audio signal representative of the audio mix to the speaker; and communicate a visual signal representative of the visualization of the audio mix to the display.

19 Claims, 19 Drawing Sheets

Related U.S. Application Data continuation of application No. 17/318,782, filed on May 12, 2021, now Pat. No. 11,438,724, which is a continuation of application No. 16/861,057, filed on Apr. 28, 2020, now Pat. No. 11,039,267, which is a continuation of application No. 15/264,164, filed on Sep. 13, 2016, now Pat. No. 10,681,489.

(60) Provisional application No. 62/289,085, filed on Jan. 29, 2016, provisional application No. 62/219,604, filed on Sep. 16, 2015.

(51) Int. Cl.
  G06F 3/01 (2006.01)
  G06F 3/16 (2006.01)

(52) U.S. Cl.
  CPC .............. G06F 3/013 (2013.01); G06F 3/017 (2013.01); G06F 3/165 (2013.01); G06F 3/167 (2013.01); H04S 7/304 (2013.01); G10H 2210/131 (2013.01)

(58) Field of Classification Search
  CPC .......... G06F 3/017; G06F 3/165; G06F 3/167; G06F 3/0346; G10H 2210/131
  See application file for complete search history.

(56) References Cited

U.S. PATENT DOCUMENTS

| | | | |
|---|---|---|---|
| 8,577,060 | B2 | 11/2013 | Weiner et al. |
| 8,950,867 | B2 | 2/2015 | Macnamara |
| 9,024,166 | B2 | 5/2015 | Ramos |
| 9,081,426 | B2 | 7/2015 | Armstrong |
| 9,215,293 | B2 | 12/2015 | Miller |
| D752,529 | S | 3/2016 | Loretan et al. |
| 9,310,559 | B2 | 4/2016 | Macnamara |
| 9,348,143 | B2 | 5/2016 | Gao et al. |
| D758,367 | S | 6/2016 | Natsume |
| D759,657 | S | 6/2016 | Kujawski et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski et al. |
| 10,681,489 | B2 | 6/2020 | Mangiat et al. |
| 11,039,267 | B2 | 6/2021 | Mangiat et al. |
| 2003/0028273 | A1 | 2/2003 | Lydecker et al. |
| 2006/0028400 | A1 | 2/2006 | Lapstun et al. |
| 2006/0028436 | A1 | 2/2006 | Armstrong |
| 2007/0028187 | A1 | 2/2007 | Katsuyama |
| 2007/0081123 | A1 | 4/2007 | Lewis |
| 2008/0250914 | A1 | 10/2008 | Reinhart et al. |
| 2011/0271186 | A1 | 11/2011 | Owens |
| 2012/0127062 | A1 | 5/2012 | Bar-Zeev et al. |
| 2012/0154557 | A1 | 6/2012 | Perez et al. |
| 2012/0162549 | A1 | 6/2012 | Gao et al. |
| 2012/0165964 | A1 | 6/2012 | Flaks et al. |
| 2013/0082922 | A1 | 4/2013 | Miller |
| 2013/0083003 | A1 | 4/2013 | Perez et al. |
| 2013/0117377 | A1 | 5/2013 | Miller |
| 2013/0124204 | A1 | 5/2013 | Wong et al. |
| 2013/0125027 | A1 | 5/2013 | Abovitz |
| 2013/0208234 | A1 | 8/2013 | Lewis |
| 2013/0236040 | A1 | 9/2013 | Crawford et al. |
| 2013/0242262 | A1 | 9/2013 | Lewis |
| 2014/0002351 | A1 | 1/2014 | Nakayama |
| 2014/0003762 | A1 | 1/2014 | Macnamara |
| 2014/0071539 | A1 | 3/2014 | Gao |
| 2014/0085210 | A1 | 3/2014 | Avrahami |
| 2014/0115468 | A1 | 4/2014 | Guerrero |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2014/0278403 | A1 | 9/2014 | Jacob et al. |
| 2014/0306866 | A1 | 10/2014 | Miller et al. |
| 2014/0328505 | A1* | 11/2014 | Heinemann .............. G06F 3/012 381/303 |
| 2015/0016777 | A1 | 1/2015 | Abovitz et al. |
| 2015/0022444 | A1 | 1/2015 | Ooi et al. |
| 2015/0025662 | A1 | 1/2015 | Di et al. |
| 2015/0032823 | A1 | 1/2015 | Miller |
| 2015/0077416 | A1 | 3/2015 | Villmer |
| 2015/0103306 | A1 | 4/2015 | Kaji et al. |
| 2015/0178939 | A1 | 6/2015 | Bradski et al. |
| 2015/0193197 | A1 | 7/2015 | Nahman et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0035140 | A1 | 2/2016 | Bickerstaff et al. |
| 2016/0066116 | A1 | 3/2016 | Grant et al. |
| 2016/0098095 | A1 | 4/2016 | Gonzalez-Banos et al. |
| 2017/0019735 | A1 | 1/2017 | Song et al. |
| 2017/0078825 | A1* | 3/2017 | Mangiat .................. G06F 1/163 |
| 2018/0336464 | A1* | 11/2018 | Karras ................. G06V 10/454 |
| 2020/0260213 | A1 | 8/2020 | Mangiat et al. |
| 2020/0389754 | A1* | 12/2020 | Prasso ....................... G06T 7/74 |
| 2022/0014870 | A1 | 1/2022 | Mangiat et al. |

FOREIGN PATENT DOCUMENTS

| | | |
|---|---|---|
| CN | 102566756 A | 7/2015 |
| EP | 2916209 B1 | 11/2019 |
| JP | H11352960 A | 10/2004 |
| JP | 2015143987 A | 3/2019 |
| KR | 1020100055286 A | 5/2010 |
| KR | 20140000948 A | 1/2014 |
| WO | 2009007512 A1 | 1/2009 |
| WO | 2013085639 A1 | 6/2013 |
| WO | 2017048713 A1 | 3/2017 |

OTHER PUBLICATIONS

"Unity—Manual: VR Overview," Unity Technologies, accessed Jul. 21, 2015, in 3 pages. URL: http://docs.unity3d.com/Manual/VROverview.html.

Aimonetti, M.: "Native Instruments Stems Format: How Does it Work or, How Should it Work?" Spliceblog, Apr. 2, 2015, in 7 pages. URL: http://splice.com/nlog/native-instruments-stems-format-how-it-works/.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

European Extended Search Report, re EP Application No. 16847135.7, dated Jun. 26, 2019.

International Preliminary Report on Patentability, re PCT Application No. PCT/US2016/051521, dated Mar. 29, 2018.

(56) References Cited

OTHER PUBLICATIONS

International Search Report and Written Opinion for PCT Application No. PCT/US2016/051521, dated Nov. 18, 2016.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Partial European Extended Search Report, re EP Application No. 16847135.7, dated Mar. 18, 2019.
Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).
Unity: "A Feature-Rich and Highly Flexible Editor," Unity Technologies, accessed Jul. 21, 2015, in 4 pages. URL: https://unity3d.com/unity/editor.
European Extended Search Report issued in counterpart EP Application No. 23187054.4 dated Oct. 5, 2023.

* cited by examiner

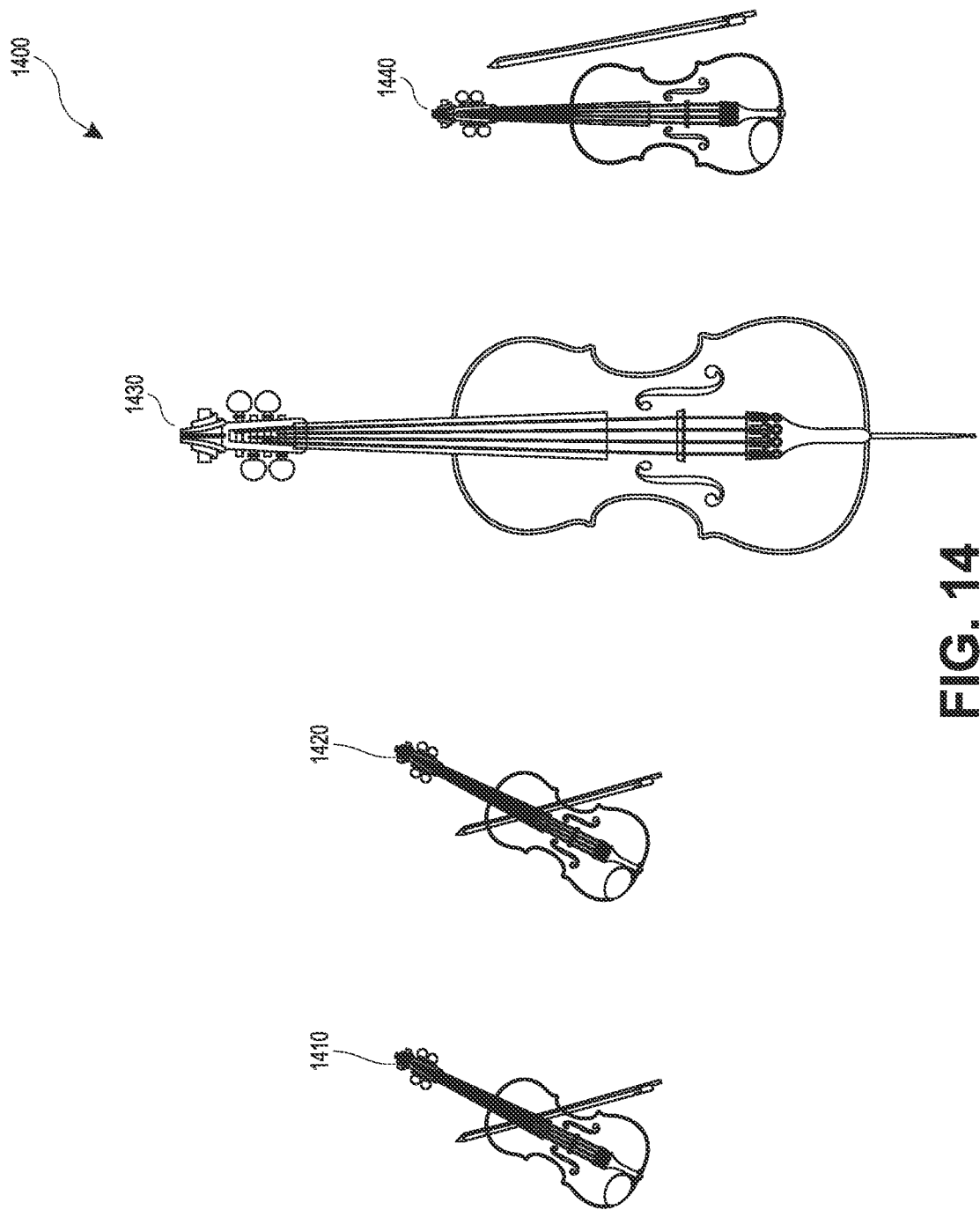

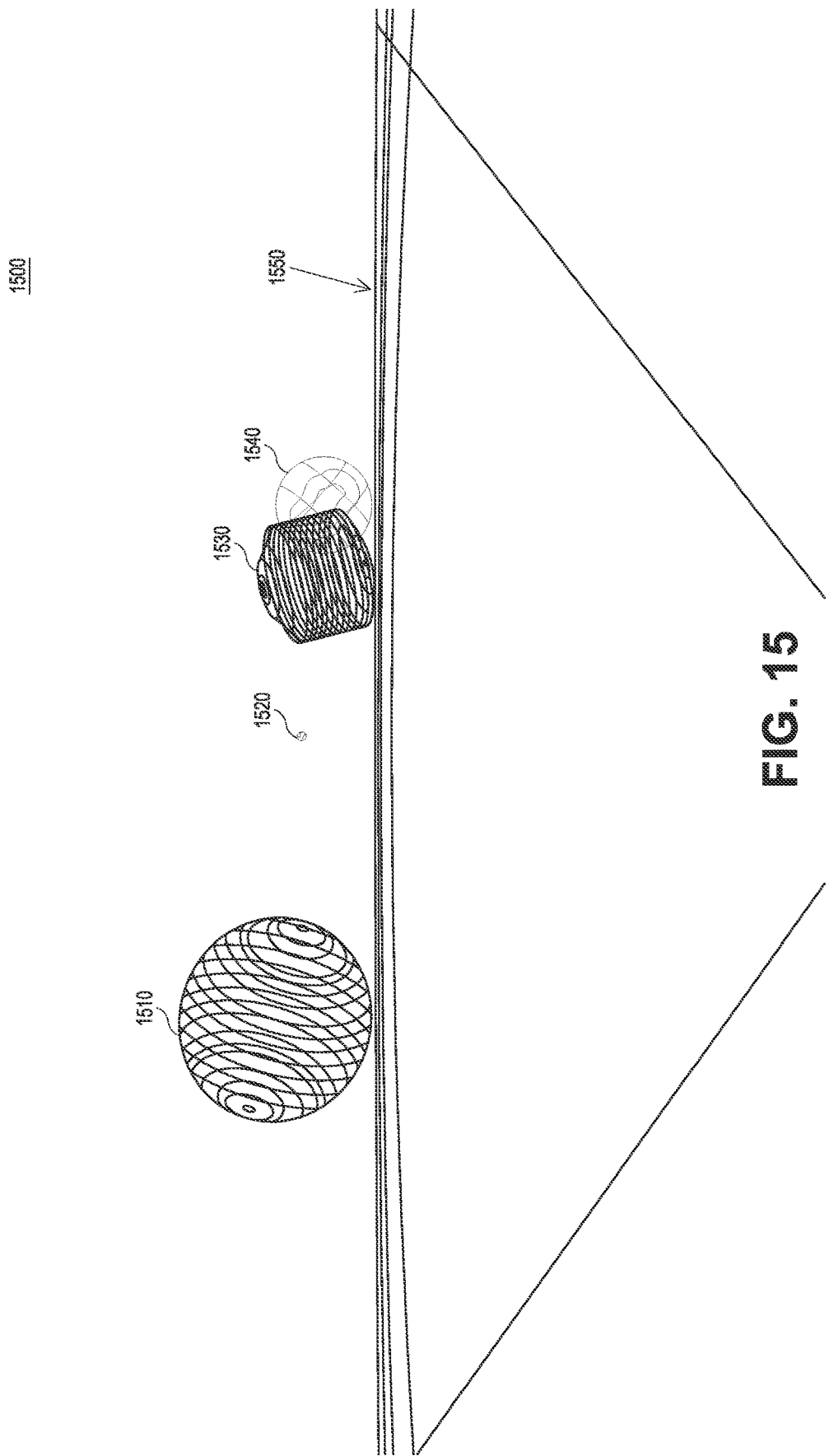

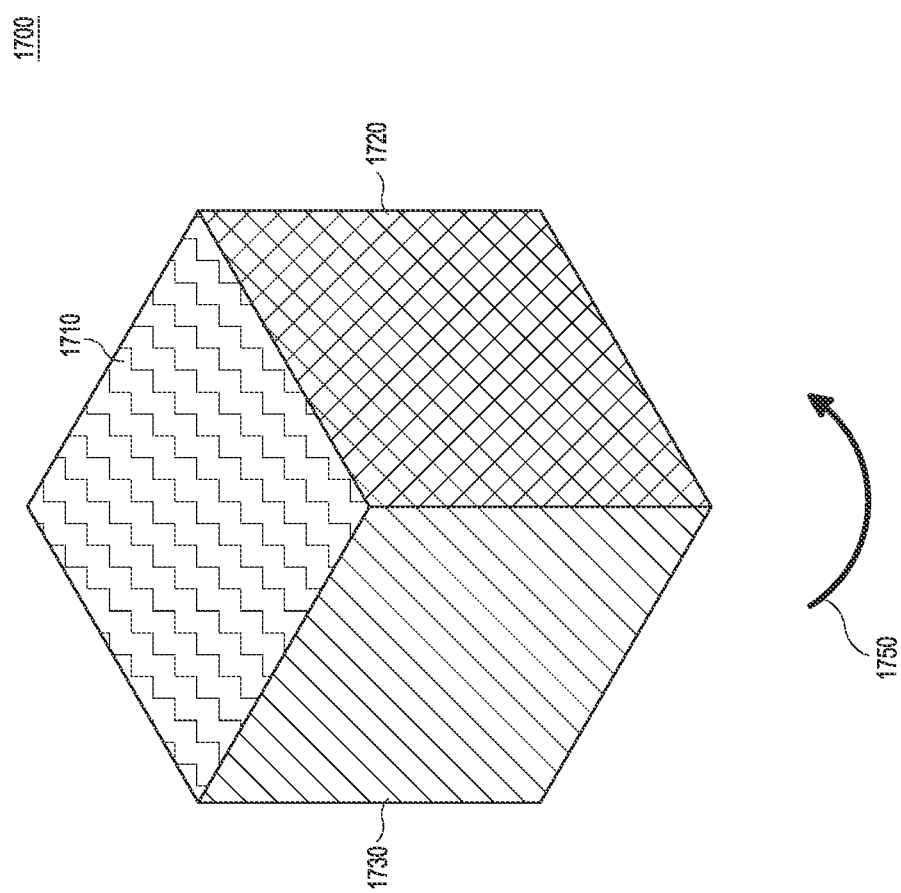

HEAD POSE MIXING OF AUDIO FILES

CROSS-REFERENCE TO RELATED APPLICATIONS

This application is a continuation of U.S. application Ser. No. 17/888,113, filed on Aug. 15, 2022, which is a continuation of U.S. application Ser. No. 17/318,782, filed on May 12, 2021, which is a continuation of U.S. application Ser. No. 16/861,057, filed on Apr. 28, 2020, which is a continuation of U.S. application Ser. No. 15/264,164, filed on Sep. 13, 2016, which claims the benefit of priority under 35 U.S.C. § 119(e) to U.S. Provisional Application No. 62/219,604, filed on Sep. 16, 2015 and to U.S. Provisional Application No. 62/289,085, filed on Jan. 29, 2016. The entire contents of each of the aforementioned applications is hereby incorporated by reference into this application.

FIELD

The present disclosure relates to virtual reality and augmented reality imaging and visualization systems and in particular to systems for mixing audio files based on a pose of a user.

BACKGROUND

Modern computing and display technologies have facilitated the development of systems for so called "virtual reality" "augmented reality" or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; an mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Examples of a wearable device that can present to a user of the display device an audible or visual representation of an audio file are described. The audio file comprises a plurality of stem tracks that represent different audio content of the audio file.

An embodiment of a wearable device comprises non-transitory memory configured to store an audio file comprising a plurality of stem tracks, with each stem track representing different audio content of the audio file; a sensor configured to measure information associated with a pose of the user of the wearable device; a display configured to present images to an eye of the user of the wearable device; a speaker configured to present sounds to the user of the wearable device; and a processor in communication with the non-transitory memory, the sensor, the speaker, and the display. The processor is programmed with executable instructions to: determine the pose of the user; generate, based at least partly on the pose of the user, an audio mix of at least one of the plurality of stem tracks of the audio file; generate, based at least partly on the pose of the user and the audio mix, a visualization of the audio mix; communicate an audio signal representative of the audio mix to the speaker; and communicate a visual signal representative of the visualization of the audio mix to the display.

In another aspect, a method for interacting with an augmented reality object is described. The method is performed under control of a hardware computer processor. The method comprises generating an augmented reality object for interaction by a user of the wearable system; detecting gestures of a user while the user interacts with the interface; associating the detected gestures with a modification to a characteristic of the augmented reality object; and modifying the augmented reality object in accordance with the modification to the characteristic of the augmented reality object. A wearable system can include a processor that performs the method for interacting with the augmented reality object.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 12-14 schematically illustrate examples of user interfaces which present to a user of a wearable system visualizations of multiple steam tracks of an audio file, where the audio file is dynamically mixed based at least in part on the user's pose.

FIG. 15 illustrates an example of a 3D user interface which shows different visual graphics at different depths in the user's environment.

FIG. 17 illustrates an example of creating a sound collage effect.

Figure 1:
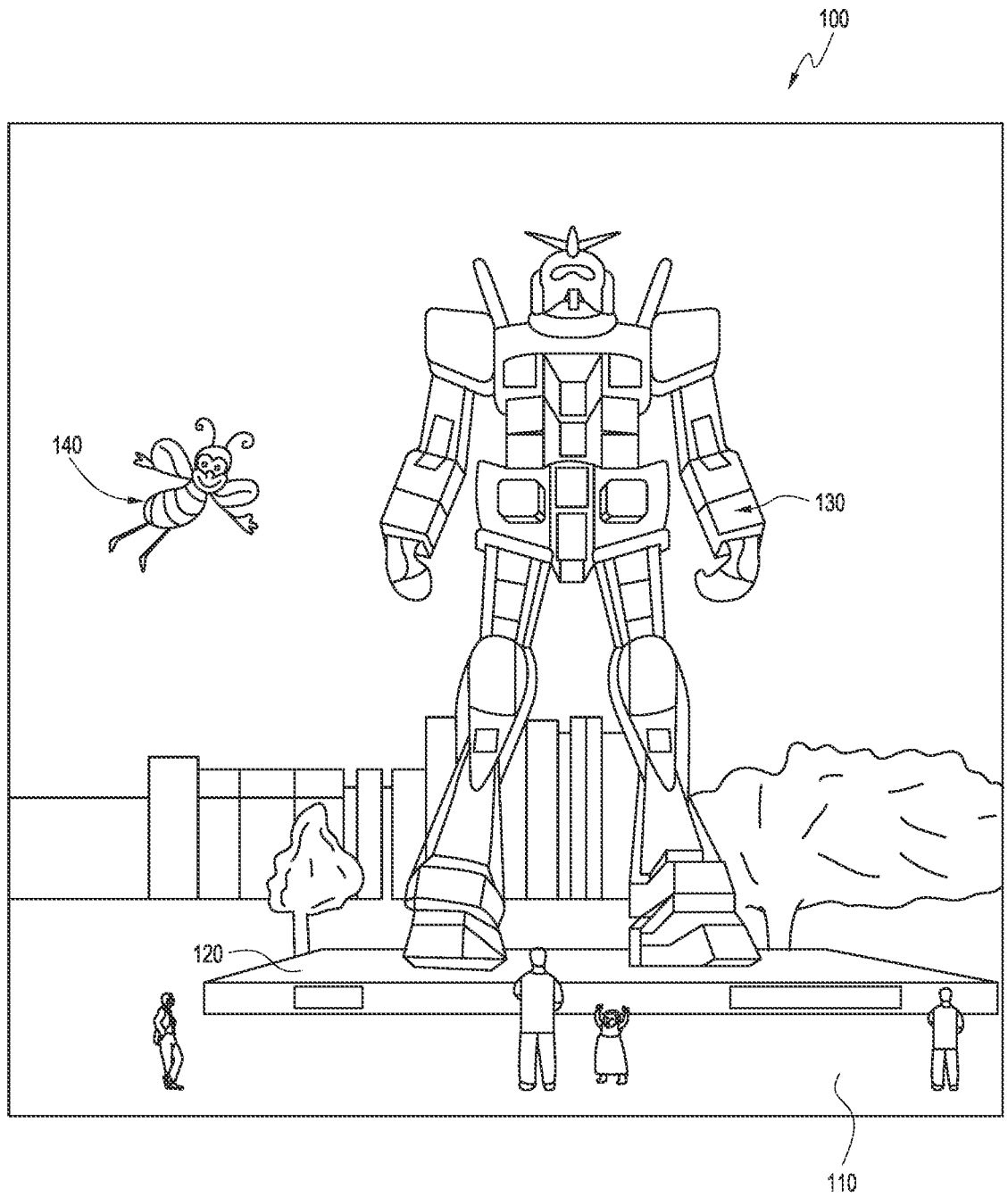
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Audio files can include multiple stem tracks that represent an audio signal for, e.g., voice, drum, guitar, bass, or other sounds. A stem track may be associated with multiple instruments such as a group of drums or a quartet of instruments, or be associated with a single source of sound such as voice or one musical instrument. A single stem track can represent a mono, stereo, or surround sound track. The audio file can include 1, 2, 3, 4, 5, 6, 8, 10, 12 or more stem tracks. In addition to the stem tracks, the audio file can also include a master track for standard playback.

A user may want to interact with stem tracks in an audio file and generate new audio files by mixing the stem tracks. However, existing user interfaces are often cumbersome for this task because they typically do not provide visualizations to the stem tracks and often require professional skills to combine multiple stem tracks.

The wearable system described herein is directed to solving this problem by providing visual graphics associated with stem tracks. For example, a visual graphic associated with a stem track may be a graphical representation of the musical instrument used for that stem track. The visual graphic may also be a virtual human if the stem track is associated with a voice.

The wearable system can allow users to easily interact with the stem tracks using poses (such as head pose, body pose, eye pose, or hand gestures). For example, a user can mix multiple stem tracks in the audio file or mix the stem tracks across multiple audio files by moving his hands or changing his head's position. The user can also modify an audio file, for example, by adjusting a stem track (such as adjusting the volume of the stem track) or by replacing a stem track with another stem track. In some embodiments, a certain mix of the stem tracks may be associated with a location in the user's environment. As the user moves to a location in the environment, the wearable system may play the sound (or a mixture of sounds) associated with that location. Additional examples of interacting with the stem tracks are further described with reference to FIGS. 12-18.

Although the examples herein are described with reference to audio files, the wearable system can also be configured to allow similar user interactions with video files, or a combination of audio and video files (such as where a video file comprises an audio sound track).

3D Display

The wearable system can be configured to present a three-dimensional (3D) user interface for a user to interact with virtual content such as visualization of stem tracks in an audio file. For example, the wearable system may be part of a wearable device that can present a VR, AR, or MR environment, alone or in combination, for user interaction.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 2:
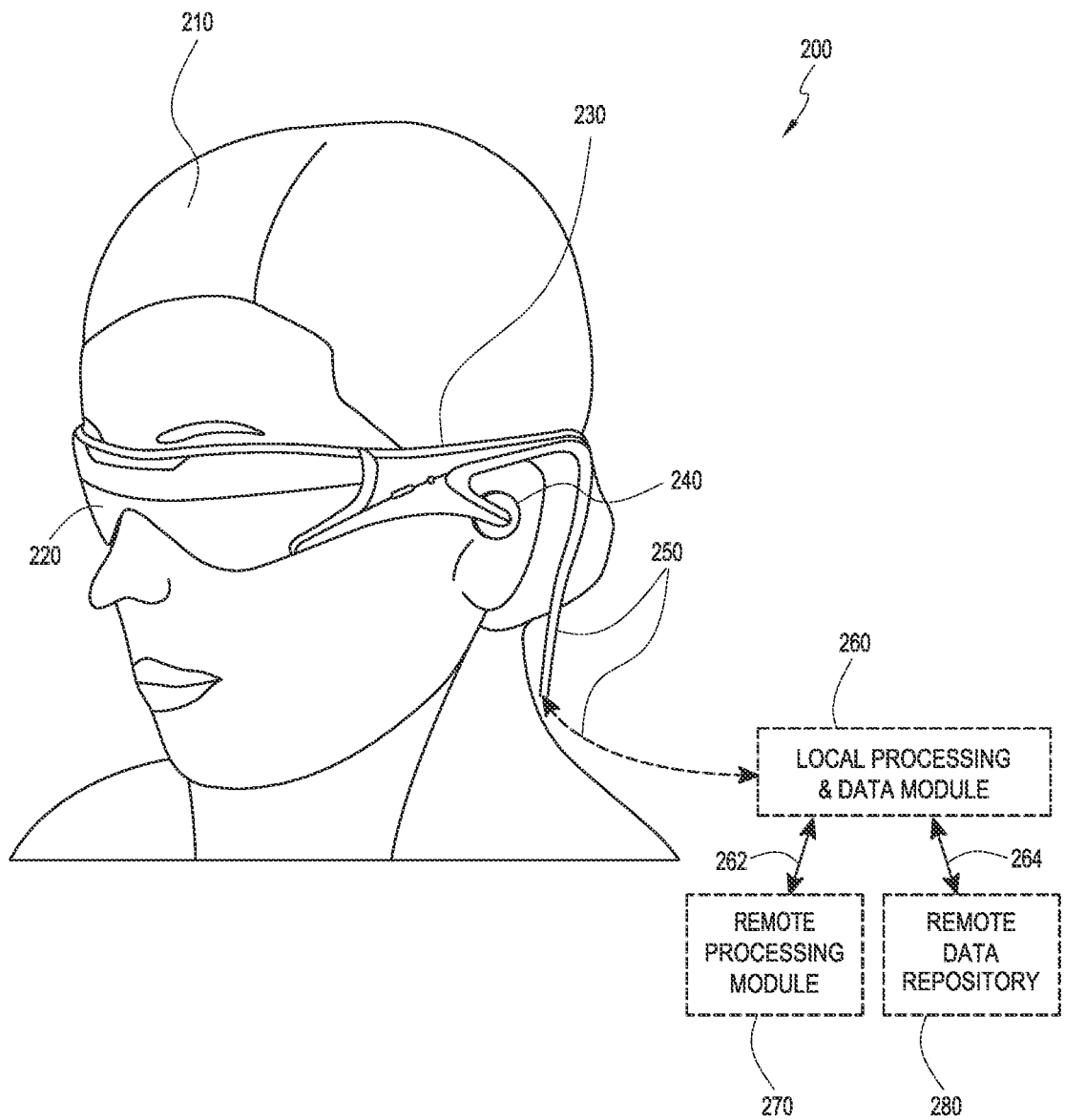
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). As further described with reference to FIGS. 12-16, the wearable system 200 can play an audio file to the user via the speaker 240 and present 3D visualizations of various stem tracks in the sound file using the display 220.

The wearable system 200 can also include an outward-facing imaging system 464 (shown in FIG. 4) which observes the world in the environment around the user. The wearable system 100 can also include an inward-facing imaging system 462 (shown in FIG. 4) which can track the eye movements of the user. The inward-facing imaging system may track either one eye's movements or both eyes' movements. The inward-facing imaging system may be attached to the frame 230 and may be in electrical communication with the processing modules 260 and/or 270, which may process image information acquired by the inward-facing imaging system to determine, e.g., the pupil diameters and/or orientations of the eyes or eye pose of the user 210.

As an example, the wearable system 200 can use the outward-facing imaging system 464 and/or the inward-facing imaging system 462 to acquire images of a pose of the user. The images may be still images, frames of a video, or a video, in combination or the like. The pose may be used to mix stem tracks of an audio file or to determine which audio content should be presented to the user.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system and/or the outward-facing imaging system), microphones, inertial measurement units (IMUs), accelerometers, compasses, global positioning system (GPS) units, radio devices, and/or gyroscopes; and/or b) acquired and/or processed using remote processing module 270 and/or remote data repository 280, possibly for passage to the display 220 after such processing or retrieval. The local processing and data module 260 may be operatively coupled by communication links 262 and/or 264, such as via wired or wireless communication links, to the remote processing module 270 and/or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

For example, the remote data repository 280 can be configured to store content of an audio file such as information associated with the stem tracks. The local processing and data module 260 and/or the remote processing module 270 can detect a user's pose, such as the user's direction of gaze. The processing modules 260 and 270 can communicate with the remote data repository 280 to obtain the stem tracks and generate visualizations of the stem tracks in the user's direction of gaze. The processing modules 260 and 270 can further communicate with the display 220 and present the visualizations to the user.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
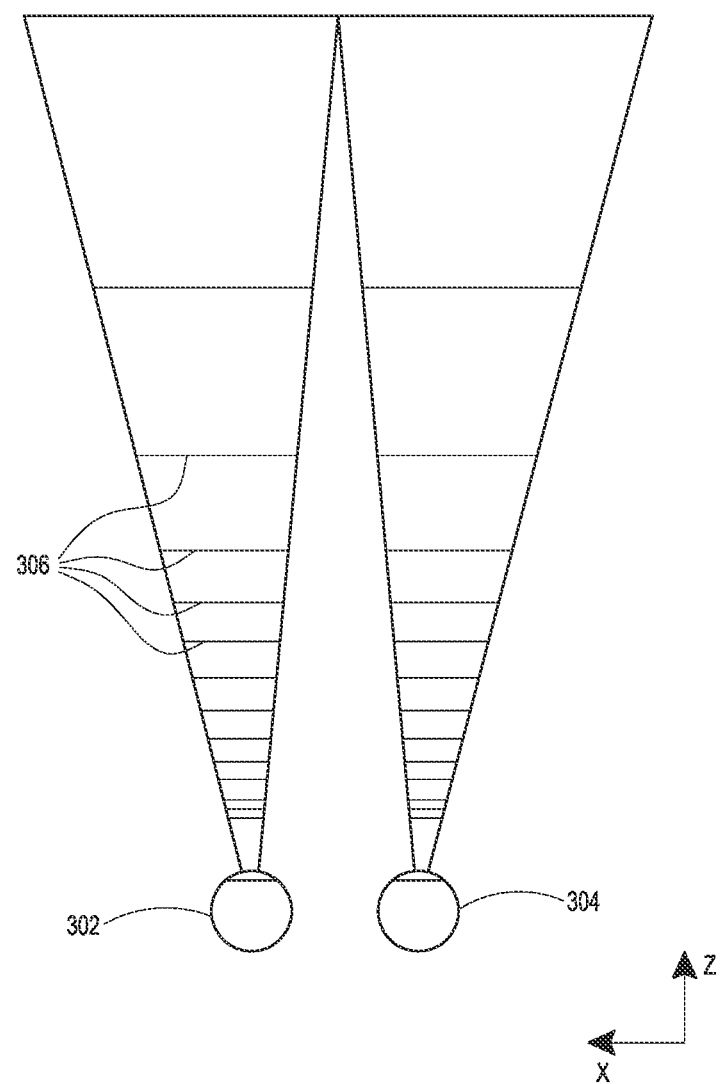
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
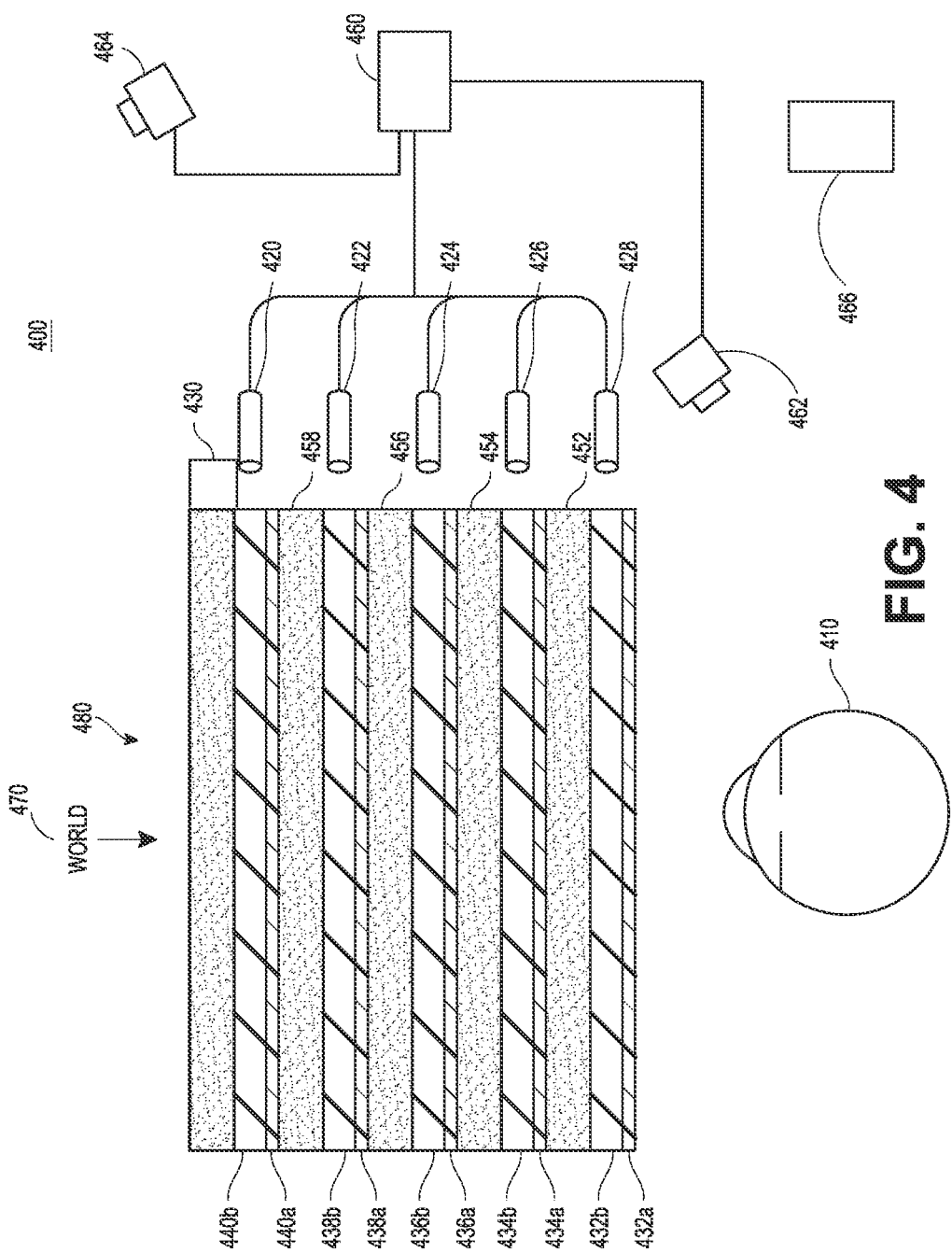
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers and/or structures for forming air gaps).

The waveguides 432b, 434b, 436b, 438b, 440b and/or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 and/or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective and/or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top and/or bottom major surfaces, and/or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface and/or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/

0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 410 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. Depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) and the imaging system 464 is sometimes referred to as an FOV camera. The entire region available for viewing or imaging by a viewer may be referred to as the field of regard (FOR). The FOR may include 4πc steradians of solid angle surrounding the wearable system 400. In some implementations of the wearable system 400, the FOR may include substantially all of the solid angle around a user of the display system 400, because the user can move their head and eyes to look at objects surrounding the user (in front, in back, above, below, or on the sides of the user). Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined and assumed to be similar for both eyes of the user. The images obtained by the inward-facing imaging system 466 may be analyzed to determine the user's eye pose and/or mood, which can be used by the wearable system 400 to decide which audio or visual content should be presented to the user. The wearable system 400 may also determine head pose (e.g., head position or head orientation) using sensors such as IMUs, accelerometers, gyroscopes, etc. The head's pose may be used alone or in combination with eye pose to interact with stem tracks and/or present audio content.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
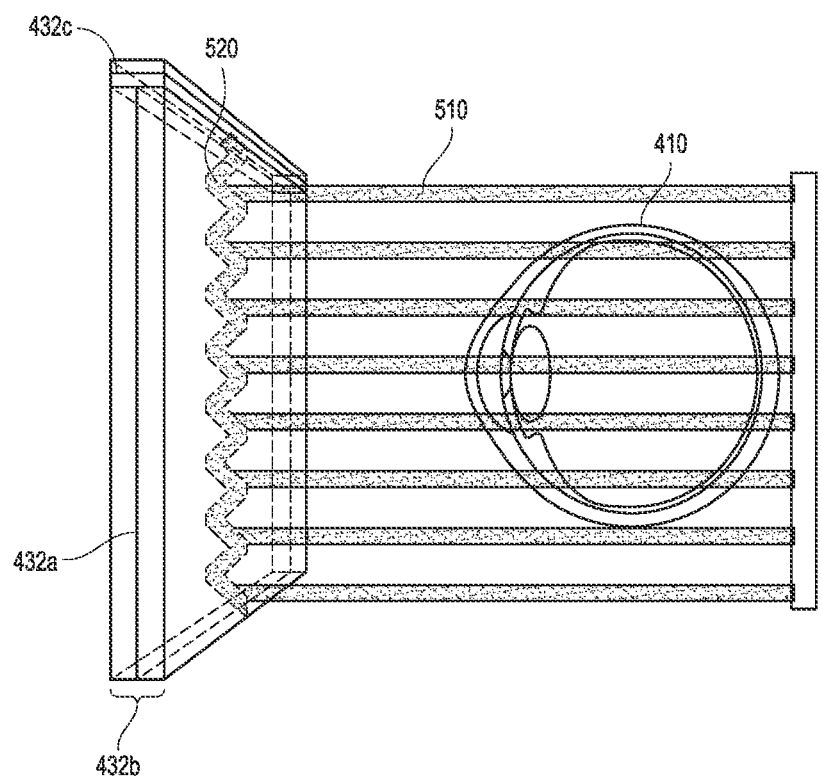
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
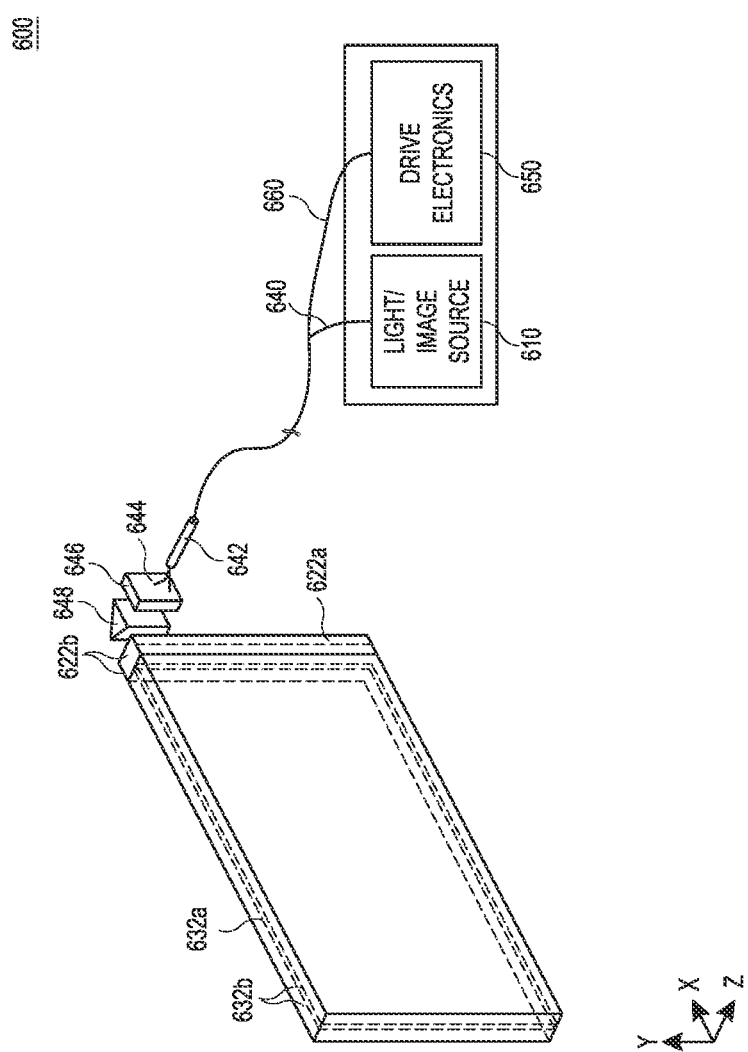
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus, may, for example include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b and/or DOE 622a may be comprised of the same materials as the primary planar waveguide 632b and/or DOE 632a, respectively. Embodiments of the optical display system 600 shown in FIG. 6 can be integrated into the wearable system 200 shown in FIG. 2.

The relayed and exit-pupil expanded light is optically coupled from the distribution waveguide apparatus into the one or more primary planar waveguides 632b. The primary planar waveguide 632b relays light along a second axis, preferably orthogonal to first axis, (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which relays and expands light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 8 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) is also located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 8 near a first mode of mechanical resonance of the fiber cantilever 644, the fiber cantilever 644 is caused to vibrate, and can sweep through large deflections.

By stimulating resonant vibration in two axes, the tip of the fiber cantilever 644 is scanned biaxially in an area filling two dimensional (2-D) scan. By modulating an intensity of light source(s) 610 in synchrony with the scan of the fiber cantilever 644, light emerging from the fiber cantilever 644 forms an image. Descriptions of such a set up are provided in U.S. Patent Publication No. 2014/0003762, which is incorporated by reference herein in its entirety.

A component of an optical coupler subsystem collimates the light emerging from the scanning fiber cantilever 644. The collimated light is reflected by mirrored surface 648 into the narrow distribution planar waveguide 622b which contains the at least one diffractive optical element (DOE) 622a. The collimated light propagates vertically (relative to the view of FIG. 6) along the distribution planar waveguide 622b by total internal reflection (TIR), and in doing so repeatedly intersects with the DOE 622a. The DOE 622a preferably has a low diffraction efficiency. This causes a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light is diffracted toward the entrance of the primary waveguide 632b. By dividing the incoming light into multiple outcoupled sets, the exit pupil of the light is expanded vertically by the DOE 4 in the distribution planar waveguide 622b. This vertically expanded light coupled out of distribution planar waveguide 622b enters the edge of the primary planar waveguide 632b.

Light entering primary waveguide 632b propagates horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the AR system may include other components in addition or in alternative to the components of the wearable system described above. The wearable system may, for example, include one or more haptic devices or components. The haptic device(s) or component (s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the AR system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the AR system may render a user interface so as to appear to a user to be on one or more surfaces of the totem. For example, the AR system may render an image of a computer keyboard and trackpad to appear to reside on one or more surfaces of a totem. For instance, the AR system may render a virtual computer keyboard and virtual trackpad to appear on a surface of a thin rectangular plate of aluminum which serves as a totem. The rectangular plate does not itself have any physical keys or trackpad or sensors. However, the AR system may detect user manipulation or interaction or touches with the rectangular plate as selections or inputs made via the virtual keyboard and/or virtual trackpad. The user input device 466 (shown in FIG. 4) may be an embodiment of a totem may, which may include a trackpad, a touchpad, a trigger, a joystick, a trackball, a rocker switch, a mouse, a keyboard, a multi-degree-of-freedom controller, or another physical input device. A user may use the totem, alone or in combination with poses, to interact with the wearable system and/or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
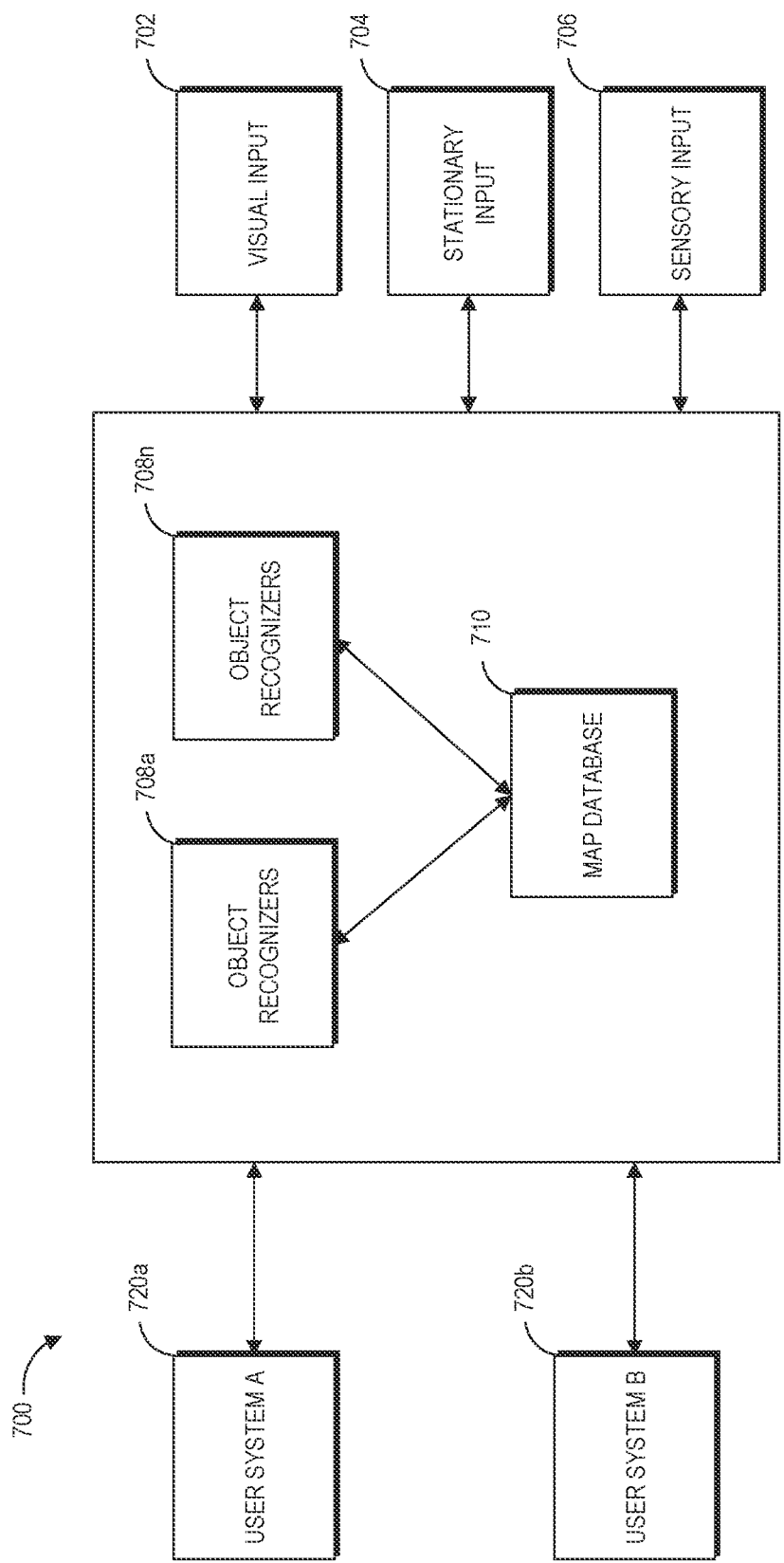
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 504, etc.) from one or more user wearable systems (e.g., wearable system 200 and/or display system 220) and/or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images and/or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize and/or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects and supplement this with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

As another example, a user's environment may be associated with certain audio content. For example, the stem tracks of an audio file may be associated with different locations of a user's room. The wearable system may pass the map of the user's environment together with the location information of stem tracks to another user thereby allowing the other user can interact with the stem tracks. As a result, the two users can collaborate on creating new audio files by mixing the stem tracks in the user's room.

As yet another example, a user can interact with stem tracks in his environment to create a new audio file. The wearable system of the user can pass the new audio files to other wearable systems for play back or broadcast the new audio file to other people (for example via speakers).

Figure 8:
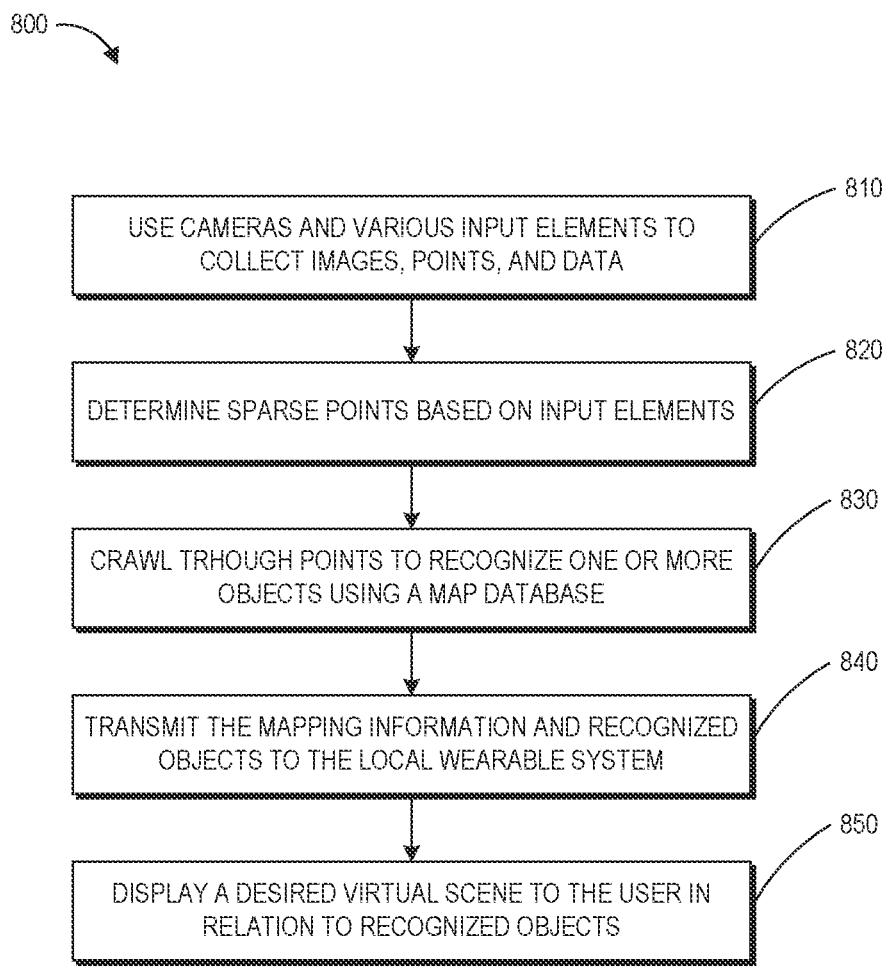
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the MR system (e.g., a wearable system). The user may be geographically remote from the scene. For example, the user may be New York, but may want to view a scene that is presently going on in California, or may want to go on a walk with a friend who resides in California.

At block 810, the AR system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, and/or hand gestures) that can be used in displaying and understanding the orientation and position of various objects in the user's surroundings. The object recognizers 708a, 708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
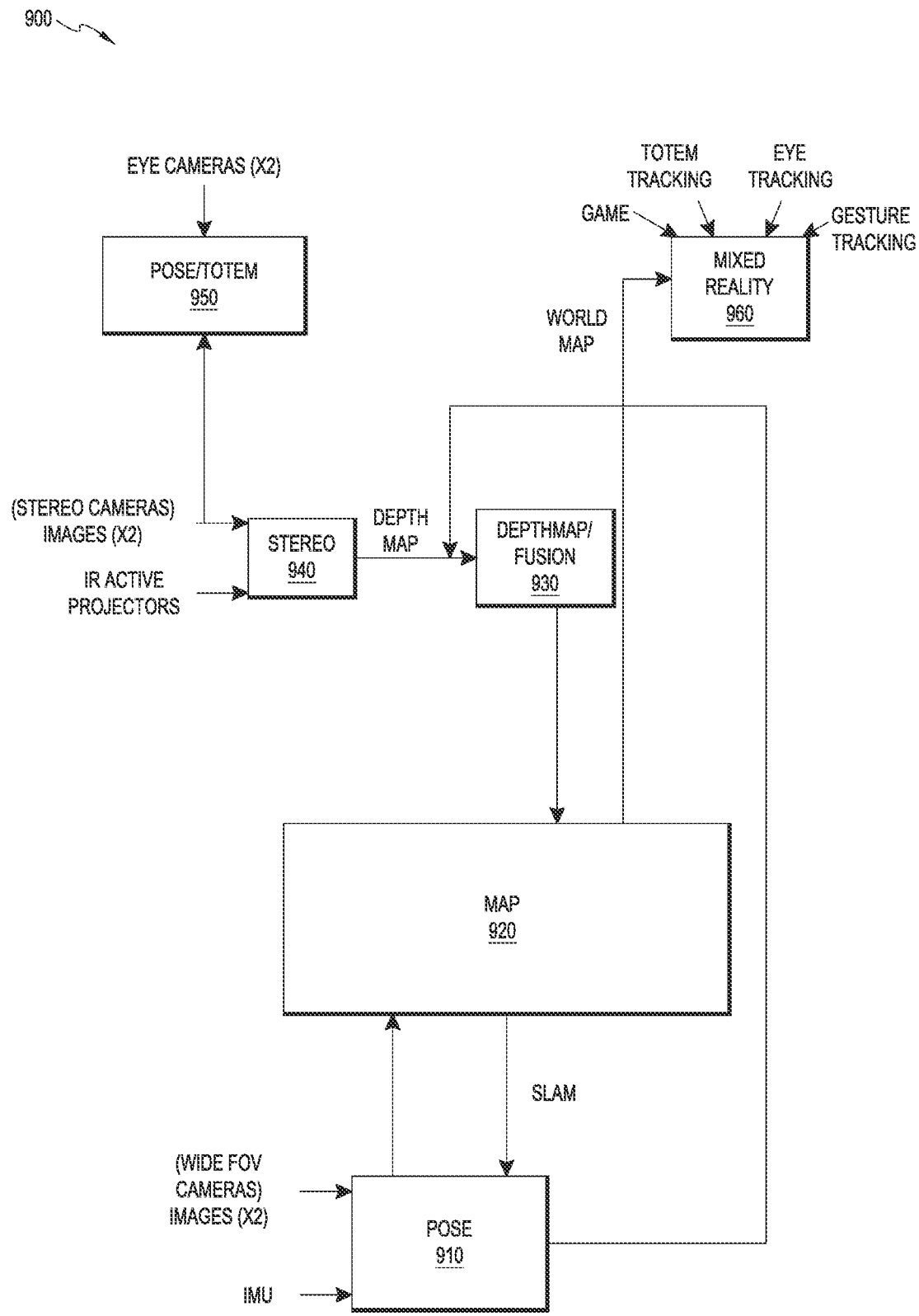
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement devices, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces are efficient (e.g., relative to a large point cloud) and digestible inputs to other processing devices like game engines. Thus, the output of the Stereo process (e.g., a depth map) 940 may be combined in the Fusion process 930. Pose may be an input to this Fusion process 930 as well, and the output of Fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem, user input device, or object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the Stereo imaging process 940 and also to capture hand gestures and totem/object tracking in front of the user's face. The cameras in the three pairs of cameras may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
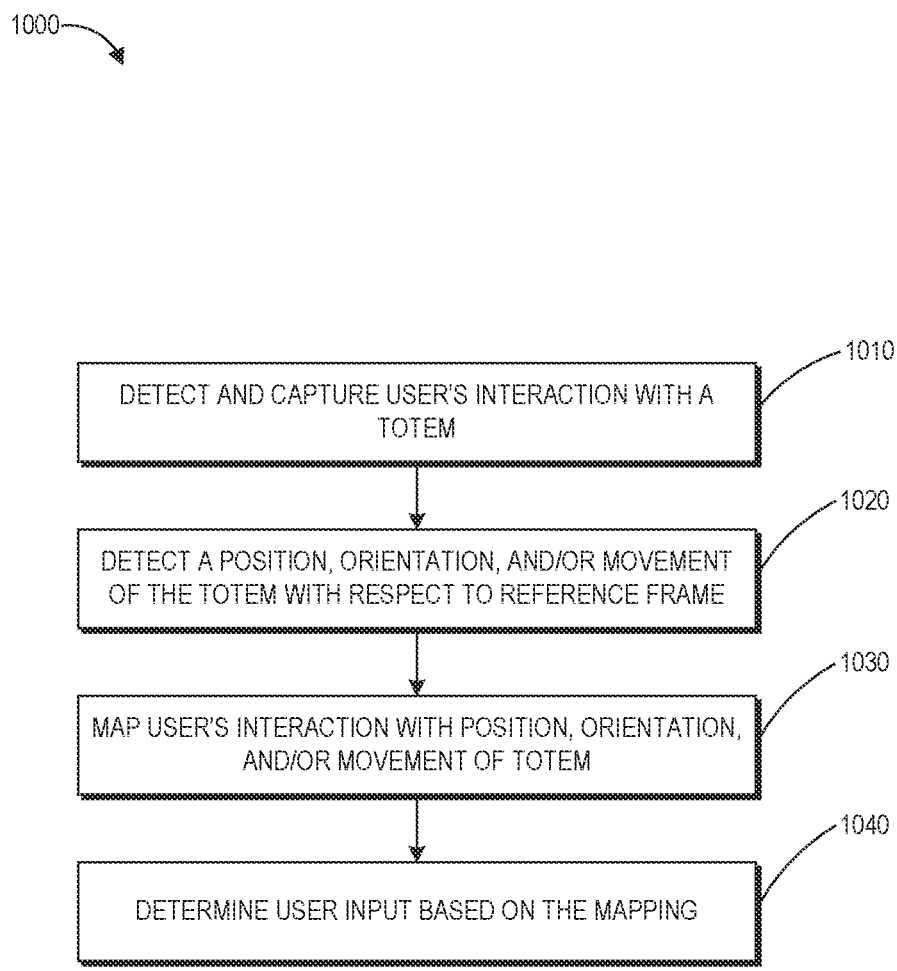
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the user's FOV camera or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use raycasting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
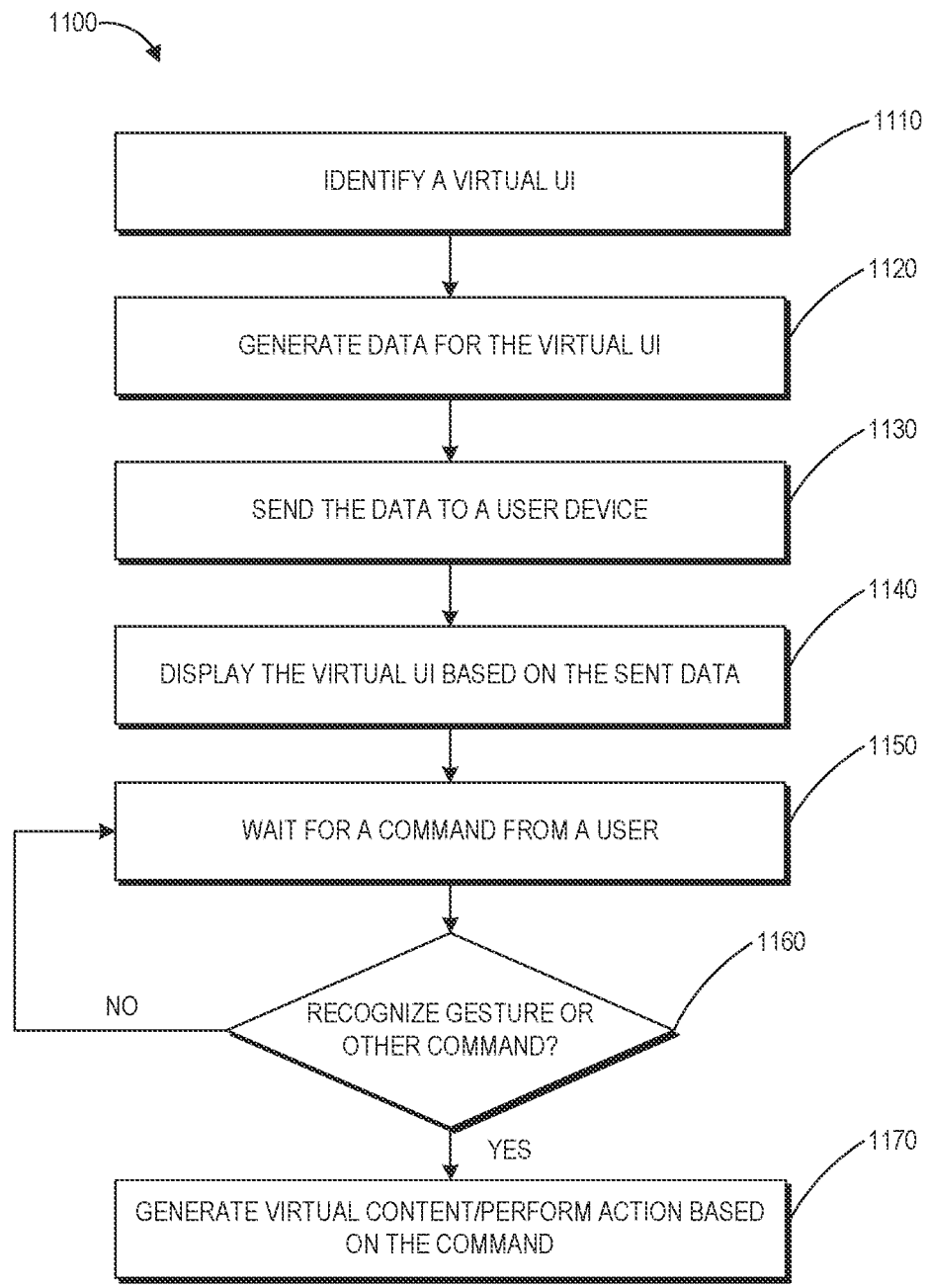
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data. As an example, the wearable system can generate graphical representations of various stem tracks in an audio file around the user.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of AR systems, UI, and user experiences (UX) are described in U.S. Patent Publication No. 2015/0016777, which is incorporated by reference herein in its entirety.

Examples of Stem Tracks

As described with references to FIGS. 2 and 4, a wearable system can play an audio file and present visualizations of audio content to a user. The wearable system can be part of a wearable device (such as a head-mounted device/display) configured to present AR, VR, and/or MR environment. The audio file can be stored and processed using local processing and data module 260, remote processing module 270, or remote data repository 280, in combination or the like.

An audio file can include a plurality of tracks. For example, the audio file can include a stereo master track, tracks for the "right" or "left" channels of a stereo system, tracks for surround sound channels, and so forth. Certain types of audio files can include a plurality of tracks representing different instruments (e.g., guitar, bass, drums, piano, synthesizer, horns) or vocals (e.g., lead vocal, backup vocal). Tracks representing different instruments or vocals are sometimes referred to as stem tracks or stems. In various implementations, the number of stem tracks can be one, two, three, four, five, six, seven, eight, ten, twelve, or more.

Stem tracks can be any partition of an audio file, where each stem track represents a different audio content of the audio file. As an example, a stem track can represent a particular instrument or vocal (e.g., guitar or lead vocal) in a recording. For example, a recording of chamber music (e.g., a string quartet) can include four separate stem tracks which represent the first violin, the second violin, the viola, and the cello. As another example, a stem track can represent a group of instruments or vocals (e.g., a rhythm section of bass and drums or a chorus). For example, for an orchestra, there may be different stem tracks representing the violins, the wood winds, the percussion, the brass, the bass, etc. Stem tracks are not limited to musical recordings and can be used for recordings of speech (e.g., different stems for different speakers).

Stem tracks can be associated with spatial locations in a user's FOR. As a result, the sound of the stem track may audibly appear to come from its associated spatial location. For example, where a stem track is associated with the right side of the user, the sound of the stem track may appear to come from the right side of the user. As the user changes his pose, the user can perceive a different sound field or visual field. In the same example, if the user turns 180 degrees, the sound may appear to come from the left side (instead of the right side) of the user. This advantageously provides a unique, user-controllable user experience.

A stem track's location can be defined relative to the user (e.g., the user's head), such as at a certain distance and/or angle with respect to the user. Additionally or alternatively, the stem track's location can be defined globally. As an example, a stem track may be positioned to be on the front wall while another stem track is positioned to be in the middle of the user's room.

The location of the stem track may change over time. For example, a stem track may be associated with a singer's voice. The position of the stem track may change as if the singer is (virtually) moving around in the user's environment. The location of the stem track may also be changed based on user interactions. As further described below, a user can move a stem track, for example, by grabbing the visual graphic associated with the stem track.

The wearable system can provide visualizations of individual stem tracks and/or one or more stem tracks combined. Thus, the wearable system can advantageously permit the user to visualize the audio spatialization and interact with the stem tracks.

In some implementations, the audio file may include the stem tracks plus additional information (e.g., metadata) that can be used by the wearable device to render an audio or visual representation of the music. For example, the additional information may include information relating to movements of musical performers on a stage (e.g., a lead singer moving or dancing around the stage), information about the acoustics or size of the performance venue (e.g., the size of the stage, the size of the concert hall, etc.), and so on. The wearable system can use this additional information to present a visual representation of a performance by a musical artist. For example, the movement information for a lead singer can be used to determine where, in the user's visual field, a representation (e.g., image or avatar) of the lead singer should be displayed as the lead singer moves around during the performance. Such embodiments can be used to create a visual rendering of a live performance where the audio track was recorded.

The information on audio stems, time series positional data for the stems, visualizations of the stem tracks, as well as one or more of the additional pieces of information may be parsed from the metadata of the audio file. For example, the audio file may be encoded in a format which supports such metadata. The metadata may specify the stem tracks and visualizations (such as shape, animation, etc.) of the associated stem tracks of the audio file. The metadata can also specify active stem tracks as well as the positions of the stem tracks at a given time of the audio file. The audio file may be in a proprietary format. To allow the audio file to be used with audio equipment that might not have the functionality to provide visualizations and mixing of stems as disclosed herein (e.g., to provide backward compatibility), the audio format may store such metadata so that older audio systems can ignore the metadata (e.g., by not reading it from the file) and read only the stereo mix of the sound file, for example.

Examples of Mixing Stem Tracks

Two or more stem tracks can be combined to produce an audio mix. The audio mix may simulate a sound field which reflects the spatial locations of the stems tracks. The audio mix may also reflect a mixture of the stem tracks, regardless of their spatial locations.

The combination (or mixing) of the stem tracks for the different instruments or vocals produces the audio mix that can be presented to a user for playback by the wearable system (e.g., via the speaker 240). The audio mix can be used to produce one or more audio channels (e.g., stereo or surround sound (which can have 5, 7, or more channels)). The wearable system can also modify the audio mix, such as e.g., the stem tracks level (e.g., loudness or softness), frequency content, dynamics (e.g., style (staccato or legato), speed), panoramic position (sometimes referred to as panning, e.g., distribution of the musical sounds among the stereo or multi-channel sound field), and can add effects (e.g., reverb), in combination or the like.

The user can interact with the stem tracks using poses or a user input device, alone or in combination. As one example, the spatialization or visualization of the mix can be based (at least partly) on the user's hand movements or by control signals received from the user input device 466 (e.g., mouse or joy stick, controllable by the user or a third party). The wearable system can identify a position of the user's hands. As the hands move, the wearable system can generate a different mix of the stem tracks for presentation (audibly or visually) to the user. In some implementations, the user may use his or her hand (or stylus or baton) to "touch" or "move" a real or virtual object seen through the display 220 of the wearable system and the wearable system may modify or adjust the mix in response to the touch or move. As another example, the user may identify a stem track (e.g., using the user input device) and move the stem track along a trajectory using his arm. The stem track may collide with another stem track. The wearable system may present a mix of these two stem tracks to the user.

In some implementations, while the user is listening to an audio file, the wearable system can dynamically mix the stem tracks of the audio file based on the user's pose (such as head, eye, foot, hand gestures, or other body poses). For example, as the user's eye(s) or head moves, the wearable system (e.g., via the processing modules 260 and/or 270) can dynamically mix the stem tracks in the audio file to create a "new" set of sounds for presentation to the user (e.g., via the speaker 240). Thus, the wearable system can advantageously spatialize the mix of the stem tracks of the audio file.

In addition, the wearable system (e.g., via the processing modules 260 and/or 270) can dynamically present visualizations of individual stem tracks or visualizations of mixed stem tracks to the user (e.g., via the display 200) based on the user's pose. This allows the user to see different visual representations of the audio mix of the stem tracks as the user's head or eye(s) pose changes.

In some implementations, the audio file may include the stem tracks as well as information associated with one or more pre-mixed combinations of the stem tracks. In such implementations, rather than dynamically mixing the stem tracks as the user's pose changes, the wearable system may access one of the pre-mixed combinations for presentation to the user. The wearable system can select a pre-mixed combination based on the user's position, the user's pose, input from the user input device, etc., alone or in combination. For example, the pre-mixed combination may reproduce the music as if it were circling around the user's head.

The user of the wearable system can also "lock" the position of sound sources in an environment (such as the user's room) or relative to an object (such as the user's head or body). For example, the user may move the stem tracks in his environment. Once the user finds an audio mix he likes, he can lock the spatial location of the stem track in the audio mix, for example, by actuating a user input device or by his pose. The audio mix can accordingly remain the same, regardless of the user's position in his environment. The user can store the "locked" mix in an audio file so that the user can re-experience the visual and sound fields in the future by replaying the audio file.

Example User Interfaces for Presenting Stem Tracks

Figure 12:
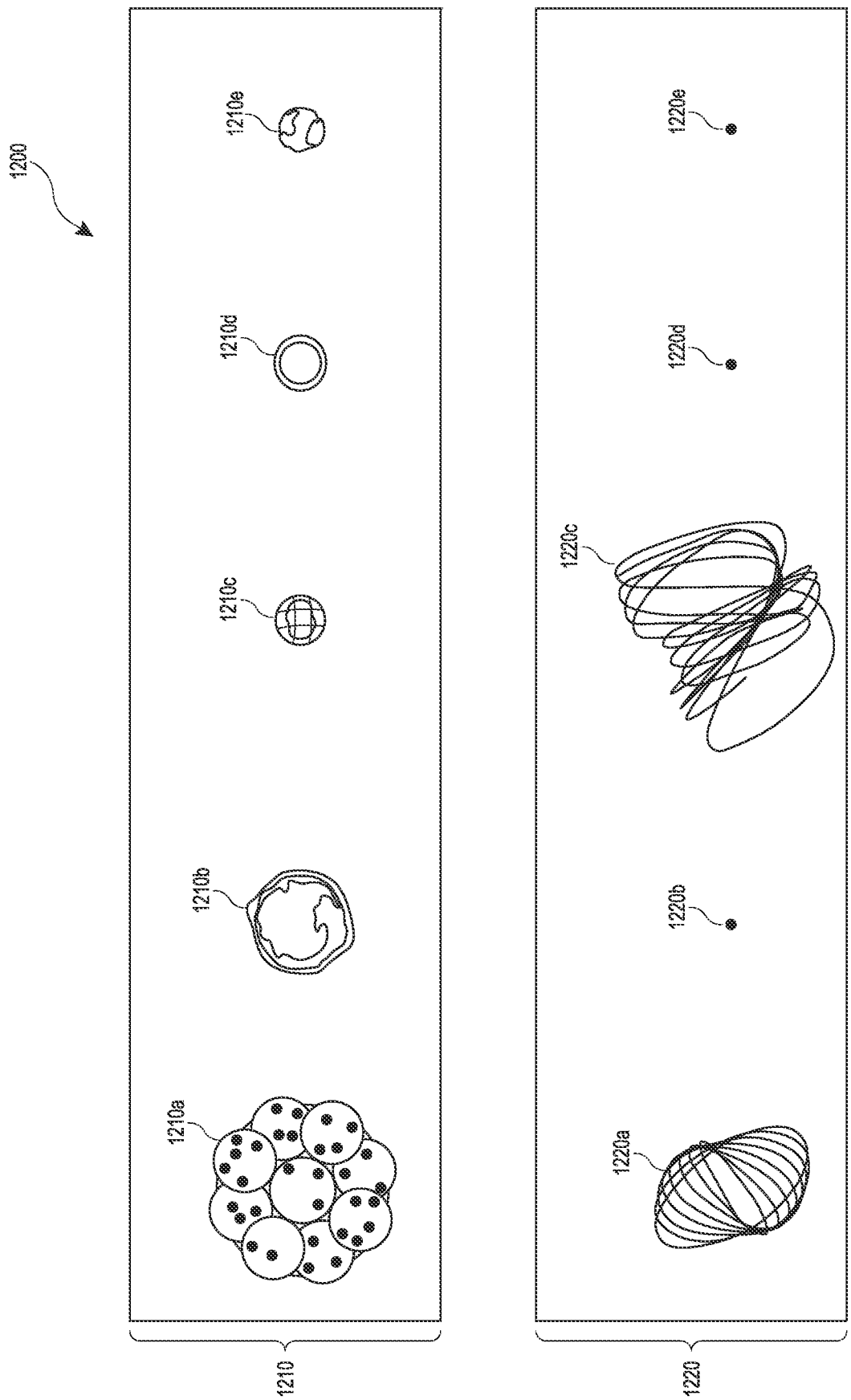
Figure 13:
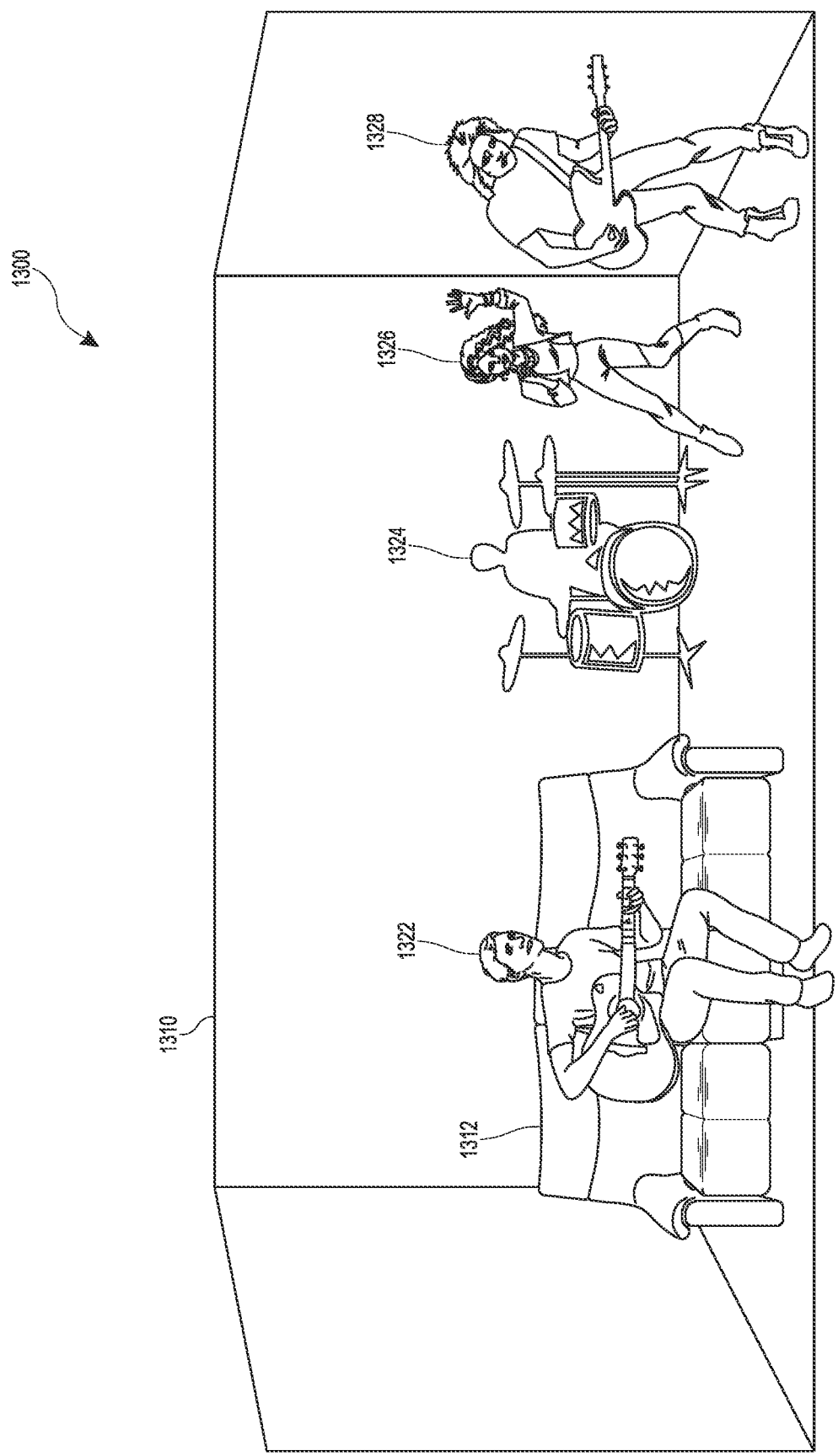

FIGS. 12, 13, and 14 schematically illustrate examples of user interfaces which present to a user of a wearable system visualizations of multiple stem tracks of an audio file. The stem tracks may be dynamically mixed based at least in part on the user's pose.

FIG. 12 schematically illustrates two example user interfaces 1210 and 1220. In the example interfaces 1210 and 1220, a mix of five stem tracks is shown. In the example user interface 1210, five different visual graphics (e.g., icons or orbs) 1210*a*-1210*e* are shown as representing the corresponding five stem tracks. The visual graphics need not be static and can move or be modified or altered as the audio file is played. In this example, when the user's head or eye pose changes, the audio mix changes and the visual representation 1210 correspondingly changes. For example, the user's eye (or head) pose may indicate the user is looking toward the direction of the graphic 1210*a*. In some such cases, the graphic 1210*a* may be displayed as emphasized (e.g., larger, brighter, etc.) than the graphics 1210*b*-1210*e* that are not in the user's gaze direction. The sound associated with the graphic 1210*a* can also be emphasized, for example, by an increase in volume. As the user's pose changes, another visual graphic may be emphasized or the user may be presented with a different sound field (corresponding to the different audio mix of the stem tracks) and a different visual field.

In some implementations, the wearable system may determine whether to emphasize a visual graphic based on the content of the audio file. For example, the wearable system may emphasize the visual graphic 1210*a* because its corresponding stem track is emphasized in volume or is the dominate track in the audio file.

In example user interface 1220, the visual graphics 1220*a* and 1220*c* are presented as Lissajous figures. In this example, there may be 5 stem tracks (1220*a* through 1220*e*) in the audio file in the user's FOV, although there may be additional stem tracks in the user's environment. However, the stem tracks corresponding to the visual graphics 1220*b*, 1220*d*, and 1220*e* are muted. As a result, the wearable system does not show (or greatly reduces in size or brightness) visual graphics in these directions (the points 1220*b*, 1220*d*, and 1220*e* are shown as dots to indicate that no (or a reduced) graphic is displayed to the user). The user will hear (e.g., through speaker 240) an audio mix of just the stem tracks associated with directions 1220*a*, 1220*c*.

In various implementations, the visual graphics 1210*a*-1210*e*, 1220*a*-1220*e* can be different from or the same as each other. Many types of visual graphics can be presented (see, e.g., the examples in FIGS. 13 and 14), and the examples described herein are intended to be illustrative and not limiting. For example, the Lissajous FIGS. 1220*a*, 1220*c* illustrated in FIG. 12A can be dynamic and their patterns can change in time, e.g., with the beat of the music.

In some implementations, the wearable system may use (at least in part) audio spectral (frequency) content of the stem tracks to determine the visualization of a corresponding visual graphic in the visual field of the user. The audio spectral content may be used to determine the placement of the visual graphic. For example, high frequencies may be displayed in a first direction, and low frequencies may be displayed in a different, second direction. As another example, sounds with different spectral content can be represented by visual graphics in different portions of the user's FOR (including in directions for which the user would have to turn around to see or hear). The audio spectral content may also be used to determine the appearance of the visual graphic. For example, wearable system can generate Lissajous figures corresponding to a stem track based on the audio spectral content of that stem track.

The user interfaces 1210 and 1220 may be presented in a VR mode of display, where the user sees the visual graphics 1210*a*-1210*e* or 1220*a*-1220*e*, but not the outside world 470 (shown in FIG. 4). The user interfaces 1210 and 1220 may also be presented in an AR or an MR mode of display, where the user sees the visual graphics 1210*a*-1210*e* or 1220*a*-1220*e* superimposed on the outside world 470 (shown in FIG. 4).

Example Interactions with Stem Tracks

The user can alter individual sound characteristics of a stem track. As an example of user interaction with the user interfaces 1210, 1220 in an AR mode of display, a disc jockey (DJ) can use hand gestures to control individual sound characteristics (e.g., volume) of the stem tracks, as they are displayed by a wearable system. A DJ utilizing the wearable system may "grab" one of the visual graphics, such as the visual graphic 1210a, to control the volume of that stem track. If the visual graphic 1210a represents the vocals track, the DJ may compress his hand to reduce the volume of that stem track. Other sound characteristics of the stem track may be altered or modified. For example, if the DJ were to select a different sound characteristic mode (e.g., by making some other hand gesture, foot pose), the DJ could alter or modify another sound characteristic of the vocals track represented by the visual graphic 1210a. If the sound characteristic mode is changed to pitch, the DJ compressing her hand in this case would decrease the pitch. If, on the other hand, the DJ wanted to increase the pitch, the DJ may use another hand gesture to increase the pitch associated with the visual graphic 1210a. For example, the DJ may "spin" the graphic 1210a by moving her hand quickly in either a clockwise or counterclockwise passion in an area associated with the graphic 1210a (e.g., on or near the graphic).

Other sound characteristics that may alter or modify the various stem tracks are possible. For example, other sound characteristics can include volume, pitch, bass, treble, tonal quality, intensity, duration, etc. Although the foregoing example has been described in the context of hand gestures, other body gestures can be used to control the sound characteristics of stem tracks appearing on the display of a wearable system.

Additionally or alternatively, some stem tracks may be displayed in a VR mode. Poses can also be used to alter or modify the stem tracks displayed in the VR mode. As another example, a DJ may tap one of their feet twice (e.g., tapping a foot twice within a certain time period of a first tap) to indicate that a sound characteristic of a stem track is to be altered or modified. Generally, various embodiments of gestures may be used to interact with the visual display. While the foregoing example has been described in terms of poses, control signals from a user input device may also alter stem tracks. For example, a user may utilize a joystick, totem, or touch-sensitive input device to alter the pitch of a particular stem track being represented as a visual graphic.

A stem track or portion thereof may also be generated by the user of the wearable system. A user generated stem track can replace the corresponding one (or more) stem track(s) of an audio file. For example, the user can substitute the user generated stem track for one of the audio's original stem tracks. The user can record a vocal track (of the user or someone else) and substitute the user vocal track for the original vocal track of the recording. Thus, the stem tracks being played may sound as if the user is singing on the audio recording. In another embodiment, if two stem tracks correspond to respective vocal tracks of a duet, a user generated vocal stem track can replace one of the voices in a duet. As yet another example, a user generated guitar solo can replace the corresponding guitar stem track of an audio recording. Any number of the audio stem tracks can be replaced, in whole or in part, with user generated stem tracks.

FIG. 13 schematically illustrates an example of an MR presentation 1300 of an audio file comprising stem tracks. In this example, the user looks through the display 220 (shown in FIG. 2) out into a room 1310 that contains a real (physical) object such as a sofa 1312. Only one physical object is shown in FIG. 13 for illustrative purpose but this is not a limitation.

In this example, the audio file includes the stem tracks that correspond to vocals, guitar, bass, and drums. The wearable system presents a visual graphic 1322 in the form of a person playing a guitar for the guitar track, a visual graphic 1328 in the form of a person playing a bass guitar for the bass track, a visual graphic 1326 in the form of a person singing for the vocal track, and a visual graphic 1324 in the form of a person playing a drum set for the drum track. Similar to the user interfaces 1210 and 1220 shown in FIG. 12, the different visual graphics 1322, 1324, 1326, and 1328 are displayed in different directions in the room 1310. In this MR presentation, the visual graphic 1322 for the guitar player is presented as if the guitar player were sitting on the (physical) sofa 1312 that is actually present in the room 1310. The visual graphics 1324, 1326, and 1328 are presented in regions of the room where there are no physical objects.

Since embodiments of the wearable system described herein are capable of presenting objects at multiple depth planes in the user's visual field (see, e.g., the discussion of FIG. 3, the waveguides 432b, 434b, 436b, 438b, 440b in the waveguide assembly 480 of the display system 400 of FIG. 4, or the waveguide 632b of the display system 600 of FIG. 6), the user interface 1300 shows the different visual graphics 1322, 1326, 1324, and 1328 at different depths in the room. For example, the bass guitarist (the visual graphic 1328) is toward the front of the room 1310, the lead singer (the visual graphic 1326) is farther back in the room 1310 but forward of the drummer (the visual graphic 1324), who is at the back of the room, farthest from the user. Additionally, in this example, the amount of detail in the different visual graphics can depend on depth. For example, since the drummer (the visual graphic 1324) appears as being farthest from the user, the visual graphic 1324 has less detail than the visual graphics 1326 and 1328, which appear as closer to the user. In embodiments where the audio file includes additional information relating to movement (e.g., of the lead singer), the wearable system can present the visual graphic 1326 representing the singer as moving around in the room 1310, for example.

The example user interface 1300 illustrated in FIG. 13 accordingly shows an example in which the different stem tracks are represented visually in the external world environment 470 (shown in FIG. 4) of the user. The wearable system may recognize objects in the environment 470 (e.g., the sofa 1312 in the room 1310), for example, by analyzing the images acquired by the outward-facing imaging system or may be in communication with totems or electronic trackers disposed in the environment 470 that can be used to assist in the display of the visual graphics. For example, a visual graphic for a particular stem track may be visualized at the position of a totem in the room 1310.

As the user moves around in the room 1310, the presentations of the stem tracks may change accordingly. For example, when the user walks close to the back of the room, the wearable system can present the visual graphic 1324 in more detail. The wearable system can also increase the volume of the drums track associated with the visual graphic 1324 to reflect that the user is closer to the drummer. In some implementations, the wearable system can adjust spatializations of stem tracks based on the location of the user. For example, when the visual graphic 1326 is presented in front of the user, the wearable system may play the audio file as if the vocal track is from the front of the user. However, as the user walks pass the visual graphic 1326 and towards the visual graphic 1324, the wearable system may play the audio file as if the vocal track is coming from the right side of the user.

In certain implementations, the wearable system can update the locations of the visual graphics as the user walks around. For example, with reference to FIG. 13, as the user moves around, the visual graphics 1322, 1324, 1326, and/or 1328 may "follow" the user in the room 1310.

The user of the wearable system can selectively choose a desired mix of the audio tracks. For example, if the stem tracks correspond to vocals, guitar, bass, and drums, the user could listen to (or see a visual representation of) just one of the stem tracks (e.g., just the vocals or just the guitar). The wearable system may present (visually and audibly) to the user only the stem tracks in the user's FOV. As the user moves his or her head or eyes, the stem tracks may move inside or out of the user's FOV. Accordingly, the user can listen to (or see) a different stem track or a different mix of the stem tracks. In some implementations, the user can mute an audio track by using an appropriate gesture (e.g., a hand gesture). For example, the user may want to listen to a guitar solo and might mute all tracks except the guitar track.

Additionally or alternatively, as described above with respect to the example of interacting with the visual display to control a sound characteristic, the visual graphics may also be modified or altered in a VR, AR, and/or MR mode of display using hand gestures. As one example, in an MR mode of display, a user may depress her hand on the bass guitarist, e.g. the visual graphic 1328, to depress the bass associated with the sound of the soundtrack played by the visual graphics 1322, 1326, 1324, and 1328. The resulting display of the visual graphic 1328 may appear smaller than the other graphics 1322, 1326, or 1324. As another example, the user can use hand gestures to control the volume of the stem track represented by visual graphics 1322, 1326, 1324, and 1328. The user may "grab" and "drag" the visual graphic 1324 of the drummer toward the front of the room 1310 to increase the volume of the drums. Conversely, to decrease the volume of the vocals, a user may "push back" the visual graphic 1324 of the drummer towards the back of the room 1310.

The visual graphics may also be modified or altered using other poses. For example, other sensors coupled to the wearable system 200, such as inertial measurement units (IMUs), may be used to detect head or body pose of the user. For example, the IMUs may detect the user nodding her head backwards and forward, which may correspond to a change in head pose. The wearable system can use this change in head pose for selection of one of the visual graphics 1322, 1324, 1326, and 1328. For example, while the user is looking at the visual graphic 1328 of the bass and nods her head, the wearable system can select the stem track corresponding to the bass. In some cases, a sufficiently "sharp" head movement (e.g., IMU measurement above a threshold) may indicate a selection of the visual graphic, whereas a more gentle head movement (IMU measurement below a threshold) may indicate adjustment of a property associated with the graphic. For example, while the user is "pushing back" the visual graphic 1326 towards the back of the room 1310, the user may nod her head towards the visual graphic 1328 to indicate the selection of the visual graphic 1328, e.g., the bass stem track. Once selected, the user can alter that stem track in some way (e.g., dampen the bass stem track), or as described above with respect to changes of the sounds characteristics of stem tracks.

Additionally or alternatively, while altering a selected stem track with poses, the user may also perform the particular stem track and replace that corresponding stem track for the audio track being played by the wearable system (e.g., as described above with respect to the example of replacing stem tracks). For example, the user may replace the vocals of the graphic 1326, while simultaneously altering other stem tracks represented by the other visual graphics, e.g., the visual graphic 1328 representing the bass stem track. Further, body poses besides head pose or hand gestures can be used. For example, a change in foot pose (e.g., tapping a foot) may indicate stepping on a guitar or drum pedal, hitting a drum, actuating an audio effect (e.g., reverb), and so forth.

FIG. 14 schematically illustrates another example of a user interface 1400 that can be presented by a wearable system. In this example, the audio file includes a string quartet (two violins, one viola, and one cello) playing a piece of chamber music. As the user of the wearable system listens to the audio file, the wearable system presents the user interface 1400 to the user and shows visual graphics 1410 and 1420 representing the violins, a visual graphic 1430 representing the cello, and a visual graphic 1440 representing the viola. As the user's head or eye pose changes, a different mix of these four instruments is presented audibly to the user. For example, if the user looks toward the direction of the violins 1410 and 1420, the user may hear audio in which the violin sounds are emphasized over the cello and viola sounds (which may be muted or played at lower volumes than the violins). The visual graphics 1410 and 1420 for the violins may correspondingly be emphasized with respect to the visual graphics 1430 and 1440 for the cello and viola. For example, the bows of the violins may be displayed as moving while the bows for the cello and viola may be shown as not moving. Although in this example, the visual graphics 1410, 1420, 1430, and 1440 appear as displayed at a common depth plane, this is not a limitation and in other example, the visual graphics representing the different instruments can be presented at different depth planes from the user. Additional examples of such 3D representation are shown in FIG. 15.

The wearable system may also be configured to allow user interactions with the displayed visual graphics. For example, the user interface 1400 may present various stem tracks with which the user can interact in the particular fashion that stem track is being represented or displayed. A particular visual graphic may be a representation of what may be altered or modified. As an example, in an MR mode of display, if the user "grabs" the viola 1440 (e.g., "grabs" the viola as described above with respect to the example of interacting with graphics displayed in the MR mode), the user may "play" the viola to modify a characteristic of the viola sounds. Continuing in the example, after the user "grabs" the viola, the user may use a wearable system generated "bow" to "play" the viola, thereby modifying a characteristic of a viola sound (e.g., volume). As another example of an MR mode of display, the user may "play" the viola to replace the corresponding viola stem track being played. For example, the user may use a wearable system generated "bow" to play the viola and generate a viola stem track. In one embodiment, this user generated viola stem track may replace the viola stem track in string quartet, so that the resulting audible sounds to the user is the user playing the viola portion of a string quartet.

Although the foregoing example has been described in the context of visual graphics of chamber instruments, other visual graphics may act as a UI to alter or modify the object for which the generated UI represents. For example, for audio tracks with electric guitars, the UI may include a representation of an electric guitar having strings, switches, and knobs. The user may pluck or strum the guitar strings, adjust the toggle switches, or rotate the knobs to control various aspects of the audio track. The visual graphic may be a skeuomorphic representation of the object to be modified. For example, a telephone graphic including a number keypad may represent a dialing function associated with the wearable system so that the user can dial a telephone number. As another example, an AR representation of a calendar may emulate the appearance of binding on a paper desk calendar. Generally speaking, any visual graphic object generated by a wearable may be used as a user interface.

Presenting Stem Tracks in the 3D Space

As described with reference to FIG. 13, the wearable system can present a 3D user interface which shows visual graphics at different depths in the user's environment. FIG. 15 illustrates another example of the 3D user interface.

In FIG. 15, there are 4 visual graphics 1510, 1520, 1530, and 1540 in the user's FOV. These visual graphics may be Lissajous figures or other graphical representations. The appearance of the visual graphics can correspond to the audio content being played to the user. For example, the user may perceive the visual graphic 1510 as the being the closest to him because its associated stem track is emphasized in the audio file (e.g., played louder in the mix). The visual graphic 1520 is shown in a reduced size because its associated stem track may be relatively muted. The visual graphics may change as the audio content changes. For example, when the stem track associated with the visual graphic 1520 is no longer muted, visual graphic 1520 may no longer appear in the reduced size.

The wearable system can place a visual graphic based on the spatial location of its associated stem. For example, the visual graphic 1520 may appear to be small because its corresponding sound comes from a faraway location (e.g., a timpanist at the back of an orchestra) whereas the visual graphic 1510 may appear larger because its corresponding sound comes from a more nearby location (e.g., a singer in front of the orchestra). As another example, the visual graphic 1540 appears to be behind the visual graphic 1530 because the stem track associated with the visual graphic 1540 may be further away from the user than the stem track associated with the visual graphic 1530. The relative distances or locations of the graphics 1510-1540 can be displayed to provide a 3D experience for the user and may dynamically change (in distance, location, size, color, shape, etc.) as the music changes or as the user's pose changes. The graphics 1510-1540 may be interactable such that the user can select one or more of them (e.g., by reaching out with the user's hand) and move the selected graphic around, which may alter a property of not only the visualization but also the sound (e.g., by making the stem track corresponding to the selected graphic louder, softer, have more or less bass or treble, etc.).

The wearable system can also move the visual graphics out of the user's FOV. FIG. 15 shows a horizon 1550 in the 3D view 1500. The wearable system can show that virtual graphics submerge under or rise from the horizon 1550. As an example, when the volume of a stem track is decreasing, the wearable system may show its associated visual graphic moving underneath the horizon 1550. As a result, the user may not be able to see the portion of the visual graphic underneath the horizon 1550. As another example, when the volume of the stem track increases, the wearable system may show that the associated visual graphic rises from the horizon 1550. In some implementations, the wearable system may show the horizon as a reflective surface (such as simulating water surface or a glass) where wearable system can show reflected images of the visual graphics 1510, 1520, 1530 and 1540 on the horizon 1550.

In some embodiment, the wearable system may display a visual graphic only when a user is sufficiently close the visual graphic. For example, in FIG. 15, the system may be configured not to show the visual graphic 1520 because it is too far away from the user. As further described with reference to FIG. 16B, wearable system may be configured to only display the visual graphic when the user can also hear the sound source associated with the visual graphic, such as, for example, when the user is inside of the audible regions of a directional sound source.

Figure 16A:
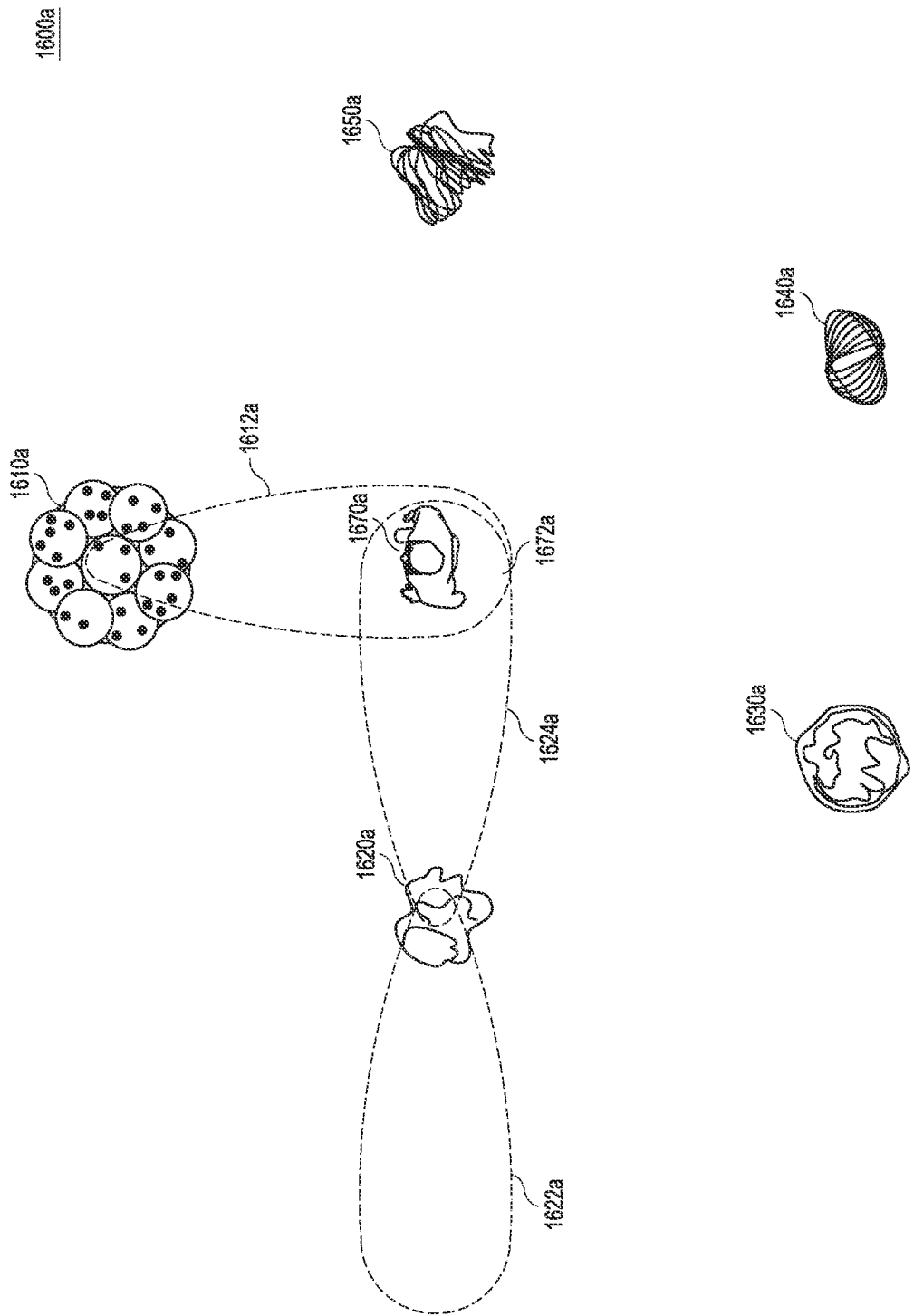
FIGS. 16A and 16B illustrate examples of directionalities of sound sources

As another example, FIG. 16A shows a bird's eye view 1600a of a user's environment. While the wearable system is playing a piece of music, the wearable system may present five (in this example) visual graphics 1610a, 1620a, 1630a, 1640a, and 1650a, each associated with a stem track of the music. In this example, the five visual graphics are placed at different locations of the user's environment. The user 1670a may stand in the middle of the room and be surrounded by the five visual graphics. At a given time, the user 1670a may see a subset of the visual graphics in his FOV even though there are other visual graphics in his environment. For example, the user 1670a may see visual graphics 1630a and 1640a at the same time in his FOV, but not the visual graphic 1610a because the visual graphic 1610a is behind the user 1670a. As the user 1670a changes his pose, other visual graphics may become visible. For example, when the user 1670a turns around, the user can perceive the visual graphic 1610a but the visual graphics 1630a and 1640a may no longer be perceivable because they are outside of the user's FOV.

Figure 16B:
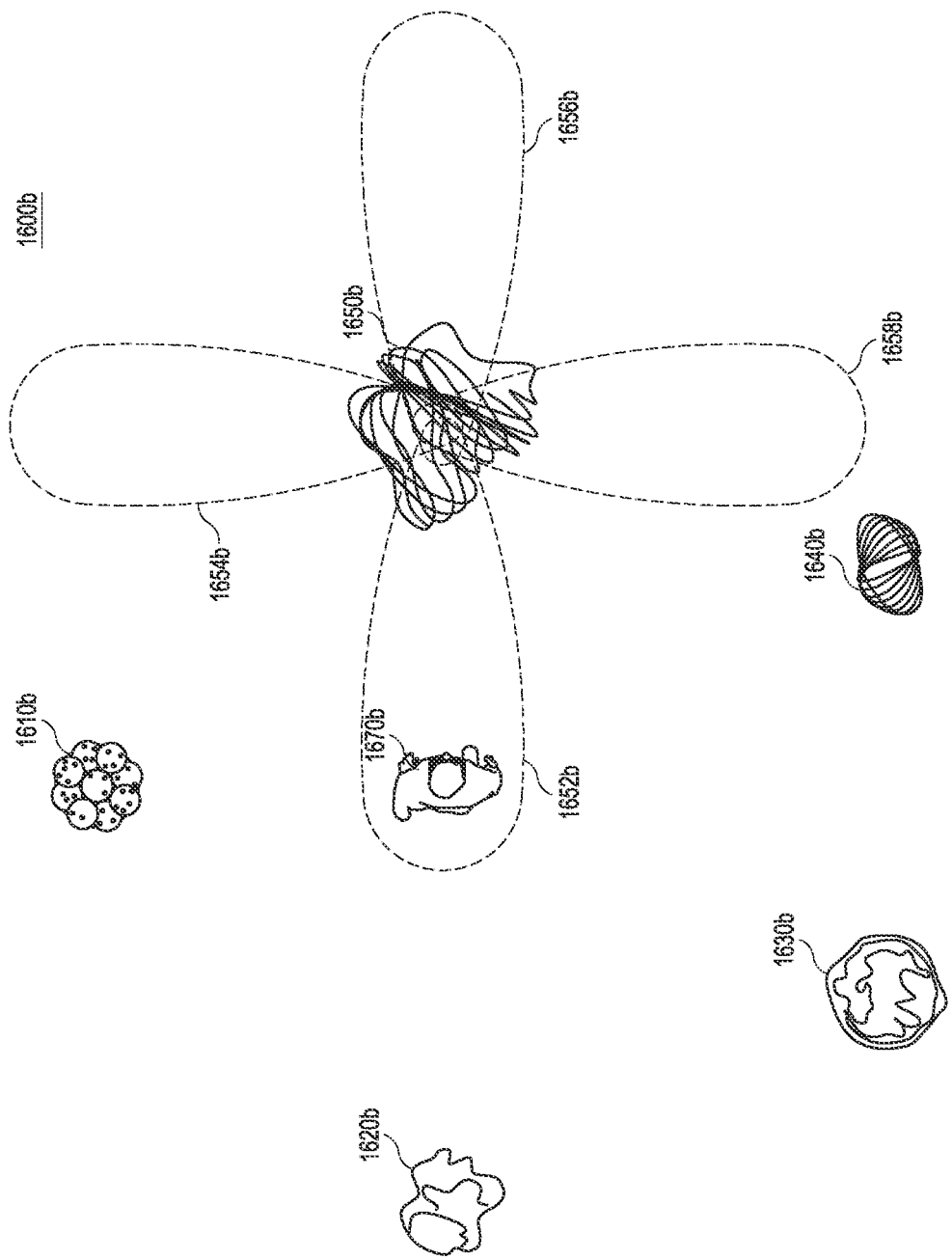

As described with reference to FIG. 13, as the user 1670a moves around in his environment, the appearance of the visual graphics may change accordingly. For example, as the user 1670a approaches the visual graphic 1610a, the wearable system may present more details of the visual graphic 1610a. The wearable system can also emphasize the visual graphic 1610a, for example, to make it appear bigger and brighter, when the user is looking at the visual graphic 1610a. However, as the user turns to a different direction, the visual graphic 1610a may reduce the size or brightness, while another visual graphic (such as 1650b) in the user's direction of gaze may be emphasized (as shown in FIG. 16B).

As another example, the user 1670a may initially perceive visual graphics 1630a and 1640a in his FOV. But as the user 1670a moves closer to the visual graphic 1630a, the visual graphic 1640a may be outside of the user's FOV and therefore the user 1670a may no longer be able to perceive the visual graphic 1640.

In certain situations, the audio content may remain the same (e.g., because the user has locked the spatial locations of the stem tracks) although the visual graphic may change based on the user's location. For example, the wearable system may make the visual graphic brighter when it's closer to the user 1670a while weaker when it's away from the user 1670a. In the meantime, the wearable system may be configured not to update the stem track associated with the visual graphic (such as not changing the volume of the stem tack) as the user 1670a moves around.

In other implementations, as the user 1670a moves around in his environment, the audio content in the audio file may be updated. For example, as the user 1670a moves closer to the location of the visual graphic 1610a, the sound associated with the visual graphic 1610a may become more prominent. Similarly, the user 1670 may initially face the visual graphics 1630a and 1640a. As a result, the stem tracks associated with the visual graphics 1630a and 1640a may be played as if they are in front of the user 1670a. However, as the user 1670a turns around, the stem tracks associated with the visual graphics 1630a and 1640a may be updated as if they are played behind the user 1670a.

Directionalities of Sound Sources

FIGS. 16A and 16B also illustrate examples of directionalities of sound sources. As shown in the bird eye views 1600a and 1600b, the stem tracks 1610a, 1620a, and 1650b may only be audible in a few directions. For example, the stem track 1610a is only audible in the region 1612a; the stem track 1620a is only audible in regions 1622a and 1624a; and the stem track 1650b (shown in FIG. 16B) is only audible in regions 1652b, 1654b, 1656b, and 1658b.

When a user is inside of the audible regions, the user can perceive the sounds associated with the audible regions. For example, in FIG. 16B, when the user is inside of the region 1652b, the user can perceive the sound associated with the visual graphic 1650b. However, if the user is outside of the regions 1652b, 1654b, 1656b, and 1658b, the user may not be able to hear the sound associated with the visual graphic 1650b.

In some implementations, the audible regions for the stem tracks may overlap. As shown in FIG. 16A, the regions 1624a and 1612a overlap at region 1672a. As a result, when the user 1670a is within the region 1672a, the wearable system may present a mixture of the sounds associated with the visual graphics 1620a and 1610a. For example, the audio mix may reflect the spatial location of the sounds. In the view 1600a, because the user is facing the visual graphic 1610a, the sound associated with the visual graphic 1610a may appear to be in front of the user while the sound associated with the visual graphic 1622a may appear to be to the left of the user in the audio mix.

The wearable system may display the visual graphic 1610a alone or in combination with visual graphic 1620a in the FOV. For example, although the user may hear the audio mix for sounds associated with visual graphic 1610a and 1620a when the user is in the region 1672a, the user may only perceive the visual graphic 1610a. In other implementations, wearable system may present both visual graphics (1610a and 1620a) since the audio mix includes the sounds associated with both visual graphics.

In some embodiments, the wearable system may be configured to only display visual graphics associated with the stem tracks when the user is within the audible regions of the stem tracks. As an example, the wearable system may display the visual graphic 1650b when the user is within the regions 1652b, 1654b, 1656b, and 1658b. As the user approaches the visual graphic 1650b, the wearable system may show the visual graphic 1650b to be a larger and brighter. In the meantime, the wearable system may optionally increase the volume of the visual graphic 1650b in the audio mix. However, when the user is outside of audible regions, the wearable system may be configured not shown the visual graphic 1650b, even though in some situations, the user is looking at the direction of visual graphic 1650b.

In certain implementations, only a subset of the stem tracks in the user's environment may have the directional sound effect. For example, in FIG. 16A, the sounds associated with visual graphics 1630a and 1640a may not have directional sound effects. As a result, while the user is in the region 1672a, the wearable system may nevertheless include the sounds associated with visual graphics 1630a and 1640a, together with the sounds associated with visual graphics 1620a and 1610a in the audio mix.

The shapes and size of the sound regions in FIGS. 16A and 16B are for illustration purposes only and are not intended to be limiting. The region impacted by the directional sound effect may be associated with shapes other than lobes. The region may also be in bigger or smaller than illustrated. For example, in some embodiments, there is no overlap among the multiple sounds. As a result, a user can only perceive one sound source when he is within the region of that sound source.

Examples of Sound Collage Effects

FIG. 17 illustrates an example of creating a sound collage effect. FIG. 17A illustrates a virtual 3D object 1700 which has multiple surfaces 1710, 1720, and 1730. Each surface may be associated with an audio stem, an audio file, a type of sound, or other sound sources, alone or in combination. The audio stem on each surface may be directional, as described above. For example, if a user is in front of the surface 1730, the user can hear the stem associated with the surface 1730, but the user may not be able to hear the stem associated with the surface 1710 because the sound associated the surface 1710 is not in the direction of the user.

The user of the wearable system can spin the 3D virtual object 1700 (or move around it), such as in the direction 1750, to create an audio mix which includes sounds (or a portion thereof) associated with the surface 1720, the surface 1730, and so on. In some implementations, the audio mix can correspond to movement of the 3D virtual object 1700. For example, where the user has stopped spinning the 3D virtual object 1700, the movement of the 3D virtual object 1700 may gradually slow down. As a result, the sound collage may include a larger portion of the sounds associated with certain surfaces.

Although the 3D virtual object 1700 is illustrated using a cubical shape, other geometric shapes may also be used for the 3D virtual object. For example, 3D virtual object may be a sphere, a cone, cuboid, polyhedron, pyramid, frustum, irregular shape, etc., alone or in combination. The stem tracks and/or sound files are also not required to be associated with the surface of the virtual object. For example, they may be associated with different volume portions of the 3D virtual object. In some implementations, there may be multiple stem tracks and/or sound files associated with a given surface and/or volume.

Example Processes of Presenting Stem Tracks

Figure 18:
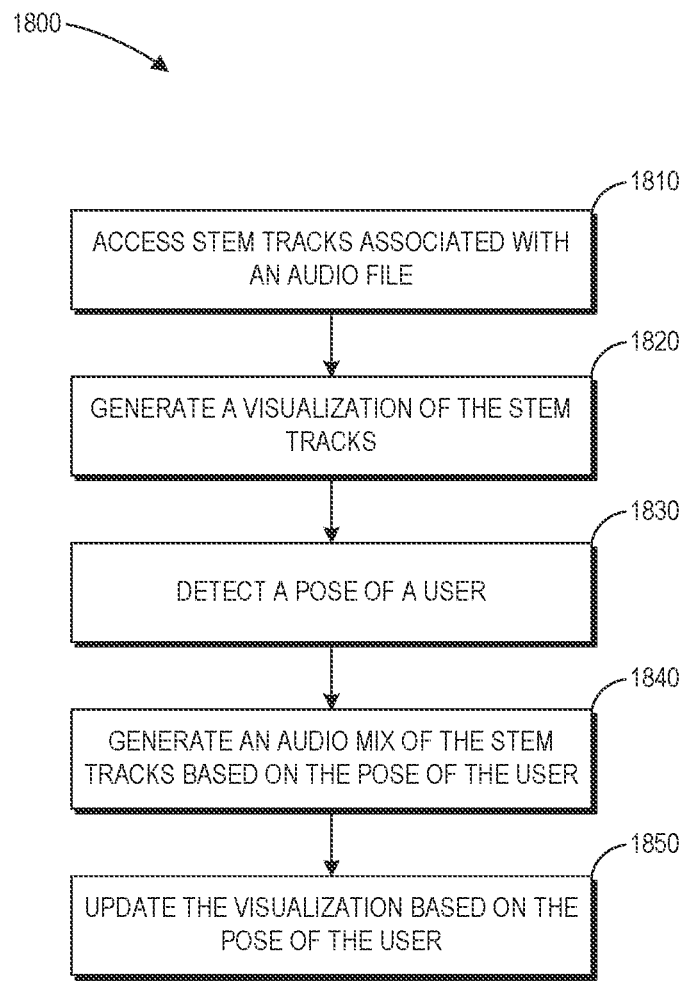
FIG. 18 illustrates an example process of presenting an audio file visually and audibly.

FIG. 18 illustrates an example process of presenting an audio file visually and audibly. The process 1800 can be performed by the wearable system described herein.

At block 1810, the wearable system can access stem tracks associated with an audio file. The wearable system can identify the stem tracks in the audio file. The wearable system can also access stem tracks stored, for example, at the remote data repository 280 (shown in FIG. 2), which may not be part of the audio file but my be used to mix with other stem tracks of the audio file.

At block 1820, the wearable system generates a visualization of the stem tracks. For example, the wearable system can provide visual graphics associated with the stem tracks. As described with reference to FIG. 12-14, the visual graphic may represent the musical instrument or the person playing the stem track or be any type of graphic shape, design, color, etc. A graphic may appear 2D or 3D. The visual graphics may change based on the audio content of the music. For example, the visual graphics may expand or shrink based on the volume, beats of the music, and so on.

The wearable system can also allow user interactions with the stem tracks using poses and/or user input device. At block 1830, the wearable system can detect a pose of the user. The pose may include hand gestures, head pose, foot pose, or other body poses. The wearable system can detect the pose of the user using the sensors (such as the IMUs and the outward-facing imaging system) described with reference to FIG. 2.

At block 1840, the wearable system can generate an audio mix of the stem tracks based on the pose of the user. For example, a user may grab the visual graphic of a stem track and cause a collision between two visual graphics. The wearable system can accordingly mix their associated stem tracks to produce the audio mix. As another example, the user can turn his body and perceive one or more visual graphics in his FOV. The wearable system can mix the stem tracks associated with the visual graphics in his FOV to generate the audio mix. As yet another example, the user may adjust a stem track, such as by adjusting the volumes or the spatial location of the stem track using poses. The wearable system can accordingly produce the audio mix based on the adjustment to the stem track.

At block 1850, the wearable system can update the visualization based on the pose of the user. For example, the wearable system can display a subset of the visual graphics in the user's FOV based on the user's position and orientation. The wearable system can also highlight or emphasize (or de-emphasize) one or more visual graphics based on the user's pose. When the two or more visual graphics collide, the wearable system can also generate and display a new visual graphic. The new visual graphic may reflect the collision between previous visual graphics, for example, by interleaving the collided visual graphics together.

The wearable system can also allow multiple users to share the interactions with the visual graphics and stem tracks. For example, there may be multiple users in a room. Each user can mix the stem tracks and the resulting audio and visual mix may be presented to all the users in the room. In some implementations, the wearable system for each user can present individualized visual graphics based on the user's position and/or orientation. For example, a user facing east may perceive a different subset of visual graphics than a user facing west. As another example, a user (such as a DJ) can interact with stem tracks in his environment to create an audio mix. The wearable system of the user can communicate the audio mix to other wearable systems for streaming or playback. The wearable system can also broadcast the audio mix to via other computing systems. For example, the wearable system can play the audio mix to other people via speakers in the room.

Although the examples described herein are described with reference to stem tracks, the techniques described herein are not limited to stem tracks. The wearable system can also present and allow user interactions with other audio content. For example, the wearable system can allow a user to mix two audio files, where one audio file has background music while the other audio file includes vocal.

Additional Embodiments

In a 1st aspect, a wearable display device comprising non-transitory memory configured to measure information associated with a pose of the wearer of the wearable display device; a display configured to present images to an eye of the wearer of the wearable display device; a speaker configured to present sounds to the wearer of the wearable display device; and a processor in communication with the non-transitory memory, the sensor, the speaker, and the display, the processor programmed with executable instructions to: determine the pose of the wearer; generate, based at least partly on the pose of the wearer, an audio mix of at least one of the plurality of stem tracks of the audio file; generate, based at least partly on the pose of the wearer and the audio mix, a visualization of the audio mix; communicate an audio signal representative of the audio mix to the speaker; and communicate a visual signal representative of the visualization of the audio mix to the display.

In a 2nd aspect, the wearable display device of aspect 1, wherein the plurality of stem tracks comprises at least four stem tracks.

In a 3rd aspect, the wearable display device of aspect 1 or aspect 2, wherein the plurality of stem tracks represent a plurality of tracks for different musical instruments.

In a 4th aspect, the wearable display device of aspect 3, wherein the plurality of stem tracks further represents a vocal track.

In a 5th aspect, the wearable display device of aspect 4, wherein the plurality of stem tracks represents a guitar, a bass guitar, a drum, and a voice.

In a 6th aspect, the wearable display device of any one of aspects 1-5, wherein the sensor comprises an eye-tracking camera, a gyroscope, an accelerometer, or an inertial measurement device.

In a 7th aspect, the wearable display device of any one of aspects 1-6, wherein the pose comprises a head pose, an eye pose, or both a head pose and an eye pose.

In an 8th aspect, the wearable display device of any one of aspects 1-7, wherein the pose comprises a gesture of the wearer.

In a 9th aspect, the wearable display device of any one of aspects 1-8, wherein the display is configured to present a plurality of depth planes to the wearer.

In a 10th aspect, the wearable display device of any one of aspects 1-9, wherein the display is configured to present a light field image to the wearer.

In an 11th aspect, the wearable display device of any one of aspects 1-10, wherein the display comprises a plurality of stacked waveguides.

In a 12th aspect, the wearable display device of any one of aspects 1-11, wherein the visualization comprises a visual graphic associated with each of the plurality of stem tracks.

In a 13th aspect, the wearable display device of aspect 12, wherein the visual graphic comprises a graphical representation of an instrument or person associated with performance of the stem track.

In a 14th aspect, the wearable display device of aspect 12 or aspect 13, wherein at least some of the visual graphics are presented at different depth planes relative to the wearer.

In a 15th aspect, the wearable display device of any one of aspects 12-14, wherein the wearable display device is configured to recognize a physical object in the vicinity of the wearer, and to present a graphical representation as being associated with the physical object.

In a 16th aspect, the wearable display device of any one of aspects 1-15, wherein the wearable display device is configured to receive input from an electronic component, and the processor is configured to generate the audio mix or the visualization based at least in part on the input.

In a 17th aspect, the wearable display device of any one of aspects 1-16, wherein at least one of the plurality of stem tracks comprises information associated with a spatial directionality of the stem track.

In a 18th aspect, the wearable display device of any one of aspects 1-17, wherein at least one of the plurality of stem tracks is associated with a spatial location relative to the wearer.

In a 19th aspect, the wearable display device of aspect 18, wherein the processor is configured to lock the spatial location associated with the at least one of the plurality of stem tracks based at least partly on the pose of the wearer or an input from an electronic component.

In a 20th aspect, the wearable display device of any one of aspects 1-19, wherein the audio file is encoded in an audio format comprising metadata indicating at least one of: the plurality of stem tracks, positional data associated with the plurality of stem tracks at a given time, or information on the visualization of the audio mix. In another aspect, an audio file is encoded in an audio format comprising metadata indicating at least one of: the plurality of stem tracks, positional data associated with the plurality of stem tracks at a given time, or information on the visualization of the audio mix. The audio file can comprise information and/or identifiers associated with the plurality of stem tracks. The audio file can include an audio mix of the plurality of stem tracks.

In a 21st aspect, the wearable display device of any one of aspects 1-20, wherein the visualization of the audio mix comprises a three-dimensional virtual object comprising a plurality of surfaces wherein each surface is associated with a stem track of the plurality of stem tracks. The audio mix can comprise a sound collage effect of the plurality of stem tracks.

In a 22nd aspect, a method for interacting with an augmented reality object, the method comprising: under control of a hardware computer processor: generating an augmented reality object for interaction by a wearer of the wearable display system, wherein the augmented reality object includes an interface for modification of a characteristic associated with the augmented reality object and displayed on a display of the wearable display system; detecting gestures of a wearer while the wearer interacts with the interface; associating the detected gestures with a modification to a characteristic of the augmented reality object; and modifying the augmented reality object in accordance with the modification to the characteristic of the augmented reality object.

In a 23rd aspect, the method of aspect 22, wherein detecting the gestures of the wearer while the wearer interacts with the interface comprises: capturing, with an outward facing image capture device of the wearable display system, a first image of a hand of the wearer; capturing, with the outward facing image capture device of the wearable display system, a second image of a hand of the wearer; and comparing the first image and the second image to detect a gesture of the wearer.

In a 24th aspect, the method of any one of aspects 22-23, wherein the augmented reality object represents a telephone, and wherein the interface corresponds to the number keypad.

In a 25th aspect, the method of any one of aspects 22-24, wherein associating the detected gestures with a modification to a characteristic of the augmented reality object comprises associating finger depressions on the telephone to modify the appearance of the number keypad.

In a 26th aspect, the method of any one of aspects 22-25, wherein modifying the augmented reality object in accordance with the modification to the characteristic of the augmented reality object comprises representing the number keypad with sequential depressions display on the keypad corresponding to the associated finger depressions.

In a 27th aspect, the method of any one of aspects 22-26, wherein the interface of the augmented reality object corresponds to a skeuomorphic representation of the augmented reality object.

In a 28th aspect, the method of any one of aspects 22-27, wherein the augmented reality object corresponds to a musical instrument or a person playing a musical instrument.

In a 29th aspect, the method of any one of aspects 22-28, wherein associating the detected gestures with the modification to the musical instrument or the person playing the musical instrument comprise detecting hand or finger movements of the wearer interacting with the musical instrument to increase an attribute of a stem track associated with the musical instrument.

In a 30th aspect, the method of any one of aspect 22-29, wherein the augmented reality object is associated with an audio file comprising at least one of a plurality of stem tracks.

In a 31st aspect, the method of aspect 30, wherein the augmented reality object is a three-dimensional virtual object comprising a plurality of surfaces wherein each surface is associated with a stem track of the plurality of stem tracks.

In a 32nd aspect, the method of aspect 31, further comprises creating a sound collage effect using the plurality of stem tracks in response to the gestures of the wearer.

In a 33rd aspect, the method of any one of aspect 30-32, wherein the stem track associated with the musical instrument is one of a plurality of stem tracks being played by an audio system coupled to the wearable display system.

In a 34th aspect, the method of any one of aspect 30-33, wherein at least one of the plurality of stem tracks is an original stem track replaced by a user generated stem track.

In a 35th aspect, the method of any one of aspect 30-34, wherein an additional augmented reality object is selected with a head gesture of the wearer for alteration of the corresponding stem track represented by the additional augmented reality object.

In a 36th aspect, the method of any one of aspects 30-35, wherein at least one of the plurality of stem tracks comprises information associated with directionality of the stem track.

In a 37th aspect, the method of any one of aspects 30-36, wherein at least one of the plurality of stem tracks is associated with a spatial location relative to the wearer.

In a 38th aspect, the method of aspect 37, further comprises locking the spatial location associated with the at least one of the plurality of stem tracks based at least partly on the gestures of the wearer.

In a 39th aspect, the method of any one of aspects 30-38, wherein the audio file is encoded in an audio format comprising metadata indicating at least one of: the plurality of stem tracks, positional data associated with the plurality of stem tracks at a given time, or information on visualizations of the plurality of stem tracks.

In a 40th aspect, a wearable display system for interacting with a visual graphic, the system comprising: a display configured to display the visual graphic; at least one outward facing camera configured to image a region in front of the wearable display system; and a computer processor configured to communicate with a network and programmed to: generate the visual graphic for interaction by a wearer of a wearable display system, wherein the visual graphic includes an interface for modification of a characteristic associated with the visual graphic; detect gestures of a wearer interacting with the wearable display system; associate the detected gestures with a modification to a characteristic of the visual graphic; and alter the visual graphic in accordance with the modification to the characteristic of the visual graphic.

In a 41st aspect, the wearable display system of aspect 40, wherein the visual graphic is associated with at least one stem tracks.

In a 42nd aspect, the wearable display system of aspect 41, wherein the stem track is directional.

In a 43rd aspect, the wearable display system of any one of aspects 41-42, wherein the stem track is associated with a spatial location relative to the wearer.

In a 44th aspect, the wearable display system of any one of aspects 41-43, wherein the computer processor is further configured to lock the spatial location of the stem track based at least partly on the pose of the wearer or an input from an electronic component.

In a 45th aspect, the wearable display system of any one of aspects 41-44, wherein the visual graphic comprises a plurality of surfaces wherein each surface is associated with a stem track of a plurality of stem tracks, and wherein the computer processor is further configured to create a sound collage effect of the plurality of stem tracks in response to detected gestures of the wearer.

In a 46th aspect, the wearable display device of any one of aspects 1-21, the method of any one of aspects 22-39, the wearable display system of any one of aspects 40-45, wherein the wearable display device and/or the wearable display system comprises a head-mounted display. In any of these aspects, the wearable display device and/or the wearable display system may comprise a light field display.

In a 47th aspect, wearable device comprising: non-transitory memory configured to store an audio file comprising a plurality of stem tracks, with each stem track representing different audio content of the audio file; a sensor configured to measure information associated with a pose of a user of the wearable device; a display configured to present images to an eye of the user of the wearable device; a speaker configured to present sounds to the user of the wearable device; and a processor in communication with the non-transitory memory, the sensor, the speaker, and the display, the processor programmed with executable instructions to: determine the pose of the user; generate, based at least partly on the pose of the user, an audio mix of at least one of the plurality of stem tracks of the audio file; generate, based at least partly on the pose of the user and the audio mix, a visualization of the audio mix; communicate an audio signal representative of the audio mix to the speaker; and communicate a visual signal representative of the visualization of the audio mix to the display.

In a 48th aspect, the wearable device of aspect 47, wherein stem tracks of the plurality of stem tracks are associated with different musical instruments or a vocal track.

In a 49th aspect, the wearable device of any one of aspects 47-48, wherein at least one stem track of the plurality of stem tracks comprises information associated with a spatial location and a spatial directionality of the stem track.

In a 50th aspect, the wearable device of any one of aspects 47-49, wherein the sensor comprises at least one of: gyroscope, an accelerometer, an inertial measurement unit, an eye tracking camera, or a camera configured to image an environment of the user.

In a 51st aspect, the wearable device of any one of aspects 47-50, wherein the pose comprises at least one of: a head pose, an eye pose, a body pose, or a hand gesture.

In a 52nd aspect, the wearable device of any one of aspects 47-51, wherein the visualization comprises visual graphics associated with respective stem tracks of the plurality of stem tracks.

In a 53rd aspect, the wearable device of aspect 52, wherein the visual graphic comprises a graphical representation of an instrument or a person associated with performance of the stem track.

In a 54th aspect, the wearable device of aspect 52, wherein at least some of the visual graphics are presented at different depth planes relative to the user.

In a 55th aspect, the wearable device of any one of aspects 47-54, wherein the wearable device is configured to recognize a physical object in an environment of the user, and to present a graphical representation of a stem track of the plurality of stem tracks as being associated with the physical object.

In a 56th aspect, the wearable device of any one of aspects 47-55, wherein the wearable device is configured to receive input from a user input device, and the processor is configured to generate the audio mix or the visualization based at least in part on the input.

In a 57th aspect, a method for interacting with an audio file, the method comprising: under control of a wearable device comprising hardware computer processor, a sensor configured to measure information associated with a pose of a user of the wearable device; a display configured to present images to an eye of the user of the wearable device; a speaker configured to present sounds to the user of the wearable device: accessing a plurality of stem tracks associated with an audio file; generating a visualization of the plurality of stem tracks; detecting the pose of the user; generating, based at least partly on the pose of the user, an audio mix of at least one of the plurality of stem tracks of the audio file; updating the visualization of the plurality of stem tracks based at least on one of the pose of the user or the audio mix; communicating an audio signal representative of the audio mix to the speaker; and communicating a visual signal representative of the visualization of the audio mix to the display.

In a 58th aspect, the method of aspect 57, wherein stem tracks of the plurality of stem tracks are associated with different musical instruments or a vocal track.

In a 59th aspect, the method of any one of aspects 57-58, wherein at least one stem track of the plurality of stem tracks comprises information associated with a spatial location and a spatial directionality of the stem track.

In a 60th aspect, the method of any one of aspects 57-59, wherein the visualization comprises visual graphics corresponding to respective stem tracks of the plurality of stem tracks.

In a 61st aspect, the method of aspect 60, wherein the visual graphics comprising musical instruments associated with the respective stem tracks or persons playing the musical instruments associated with the respective stem tracks.

In a 62nd aspect, the method of aspect 60, wherein at least some of the visual graphics are presented at different depth planes relative to the user.

In a 63rd aspect, the method of any one of aspects 57-62, wherein the pose comprises at least one of: a head pose, an eye pose, a body pose, or a hand gesture.

In a 64th aspect, the method of any one of aspects 57-63, wherein updating the visualization comprises emphasizing or de-emphasizing a visual graphic associated with a stem track of a plurality of stem tracks.

In a 65th aspect, the method of any one of aspects 57-64, further comprising: receiving a selection of a stem track of the plurality of stem tracks; receiving an indication to modify the stem track, wherein the indication comprises a change in the pose of the user or an input from a user input device; and modifying the stem track based at least partly on the indication.

In a 66th aspect, the method of aspect 65, where in modifying the stem track comprising at least one of: adjusting the volume, replacing the stem track with another stem track, muting the stem track, emphasizing the stem track over other stem tracks of the plurality of stem tracks.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computing system comprising:
   a wearable display configured to present, to a user, augmented reality (AR) content in a three-dimensional (3D) environment;
   at least one sensor configured to provide sensor data usable to determine a pose of a user in the 3D environment;
   at least one speaker configured to present audio content to the user; and
   at least one processor communicatively coupled to the display, the at least one sensor, and the at least one speaker, the at least one processor configured to execute software instructions to:
   determine, based at least on the sensor data, the pose of the user in the 3D environment;
   cause the wearable display to present a first virtual object and a second virtual object in the 3D environment, wherein each of the first virtual object and the second virtual object includes a respective one or more portions that are each associated with a respective audio track; and
   in response to determining that a first portion of the first virtual object and a second portion of the second virtual object are along a direction of the pose of the user in the 3D environment:
   determine a first audio track associated with the first portion of the first virtual object;
   determine a second audio track associated with the second portion of the second virtual object;
   determine an audio mix of at least the first audio track and the second audio track; and
   cause the at least one speaker to play the audio mix.

2. The computing system of claim 1, wherein the first portion is a first surface of the first virtual object, and wherein the second portion is a second surface of the second virtual object.

3. The computing system of claim 1, wherein at least one of the first audio track or the second audio track is a vocal track.

4. The computing system of claim 1, wherein the at least one sensor comprises at least one of a gyroscope, an accelerometer, an inertial measurement unit, an eye tracking camera, or a camera configured to image a physical environment of the user.

5. The computing system of claim 1, wherein the pose comprises at least one of a head pose, an eye pose, a body pose, or a gesture of the user.

6. The computing system of claim 1, wherein the first virtual object comprises a graphical representation of a person associated with performance of the first audio track.

7. The computing system of claim 1, wherein the first virtual object and the second virtual object are presented at different depth planes relative to the user.

8. The computing system of claim 7, wherein the audio mix is determined based at least partly on relative distances of the first virtual object and the second virtual object from the user.

9. The computing system of claim 8, wherein relative levels of the first audio track and the second audio track in the audio mix are based at least partly on the relative distances of the first virtual object and the second virtual object from the user.

10. A computer-implemented method, performed by one or more hardware computer processors, the method comprising:
    determining, based at least on sensor data provided by at least one sensor, a pose of a user in a three-dimensional (3D) environment that is presented to the user by a wearable display;
    causing the wearable display to present a first virtual object and a second virtual object in the 3D environment, wherein each of the first virtual object and the second virtual object includes a respective one or more portions that are each associated with a respective audio track; and
    in response to determining that a first portion of the first virtual object and a second portion of the second virtual object are along a direction of the pose of the user in the 3D environment:
    determining a first audio track associated with the first portion of the first virtual object;
    determining a second audio track associated with the second portion of the second virtual object;
    determining an audio mix of at least the first audio track and the second audio track; and
    causing the audio mix to be played by at least one speaker.

11. The method of claim 10, wherein the first portion is a first surface of the first virtual object, and wherein the second portion is a second surface of the second virtual object.

12. The method of claim 10, wherein at least one of the first audio track or the second audio track is a vocal track.

13. The method of claim 10, wherein the at least one sensor comprises at least one of a gyroscope, an accelerometer, an inertial measurement unit, an eye tracking camera, or a camera configured to image a physical environment of the user.

14. The method of claim 10, wherein the pose comprises at least one of a head pose, an eye pose, a body pose, or a gesture of the user.

15. The method of claim 10, wherein the first virtual object comprises a graphical representation of a person associated with performance of the first audio track.

16. The method of claim 10, wherein the first virtual object and the second virtual object are presented at different depth planes relative to the user.

17. The method of claim 16, wherein the audio mix is determined based at least partly on relative distances of the first virtual object and the second virtual object from the user.

18. The method of claim 17, wherein relative levels of the first audio track and the second audio track in the audio mix are based at least partly on the relative distances of the first virtual object and the second virtual object from the user.

19. Non-transitory computer-readable storage media storing software instructions that are executable by a computing system to cause the computing system to perform operations comprising:
- determining, based at least on sensor data provided by at least one sensor, a pose of a user in a three-dimensional (3D) environment that is presented to the user by a wearable display;
- causing the wearable display to present a first virtual object and a second virtual object in the 3D environment, wherein each of the first virtual object and the second virtual object includes a respective one or more portions that are each associated with a respective audio track; and
- in response to determining that a first portion of the first virtual object and a second portion of the second virtual object are along a direction of the pose of the user in the 3D environment:
- determining a first audio track associated with the first portion of the first virtual object;
- determining a second audio track associated with the second portion of the second virtual object;
- determining an audio mix of at least the first audio track and the second audio track; and
- causing the audio mix to be played by at least one speaker.

* * * * *